United States Patent
Silverman et al.

(10) Patent No.: US 8,583,418 B2
(45) Date of Patent: Nov. 12, 2013

(54) SYSTEMS AND METHODS OF DETECTING LANGUAGE AND NATURAL LANGUAGE STRINGS FOR TEXT TO SPEECH SYNTHESIS

(75) Inventors: Kim Silverman, Mountain View, CA (US); Devang Naik, San Jose, CA (US); Kevin Lenzo, Pittsburgh, PA (US); Caroline Henton, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 1130 days.

(21) Appl. No.: 12/240,420

(22) Filed: Sep. 29, 2008

(65) Prior Publication Data
US 2010/0082329 A1    Apr. 1, 2010

(51) Int. Cl.
*G06F 17/27* (2006.01)
*G06F 17/20* (2006.01)

(52) U.S. Cl.
USPC ........................................ 704/9; 704/8; 704/1

(58) Field of Classification Search
USPC .............................................. 704/4, 8, 9, 10
See application file for complete search history.

(56) References Cited

U.S. PATENT DOCUMENTS

| | | |
|---|---|---|
| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |

(Continued)

FOREIGN PATENT DOCUMENTS

| | | | |
|---|---|---|---|
| DE | 3837590 A1 | 5/1990 | |
| DE | EP 1909263 | * 2/2006 | .............. G10L 15/22 |

(Continued)

OTHER PUBLICATIONS

Jose P. G. Mahedero, Pedro Cano, Alvaro Martinez. 2005. Natural language processing of lyrics. In Proceedings of the 13th annual ACM international conference on Multimedia (Multimedia '05). ACM, New York, NY, USA, 475-478.*

(Continued)

*Primary Examiner* — Paras D Shah
*Assistant Examiner* — Matthew Baker
(74) *Attorney, Agent, or Firm* — Morgan, Lewis & Bockius LLP

(57) ABSTRACT

Algorithms for synthesizing speech used to identify media assets are provided. Speech may be selectively synthesized form text strings associated with media assets. A text string may be normalized and its native language determined for obtaining a target phoneme for providing human-sounding speech in a language (e.g., dialect or accent) that is familiar to a user. The algorithms may be implemented on a system including several dedicated render engines. The system may be part of a back end coupled to a front end including storage for media assets and associated synthesized speech, and a request processor for receiving and processing requests that result in providing the synthesized speech. The front end may communicate media assets and associated synthesized speech content over a network to host devices coupled to portable electronic devices on which the media assets and synthesized speech are played back.

20 Claims, 9 Drawing Sheets

(56) References Cited

U.S. PATENT DOCUMENTS

| | | |
|---|---|---|
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,944,013 A | 7/1990 | Gouvianakis et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,392,419 A * | 2/1995 | Walton ................. 358/1.13 |
| 5,396,625 A | 3/1995 | Parkes |
| 5,400,434 A | 3/1995 | Pearson |
| 5,424,947 A | 6/1995 | Nagao et al. |
| 5,434,777 A | 7/1995 | Luciw |
| 5,455,888 A | 10/1995 | Iyengar et al. |
| 5,469,529 A | 11/1995 | Bimbot et al. |
| 5,475,587 A | 12/1995 | Anick et al. |
| 5,479,488 A | 12/1995 | Lenning et al. |
| 5,491,772 A | 2/1996 | Hardwick et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,548,507 A * | 8/1996 | Martino et al. ................. 704/1 |
| 5,574,823 A | 11/1996 | Hassanein et al. |
| 5,577,241 A | 11/1996 | Spencer |
| 5,579,436 A | 11/1996 | Chou et al. |
| 5,581,655 A | 12/1996 | Cohen et al. |
| 5,596,676 A | 1/1997 | Swaminathan et al. |
| 5,608,624 A | 3/1997 | Luciw |
| 5,613,036 A | 3/1997 | Strong |
| 5,617,507 A | 4/1997 | Lee et al. |
| 5,621,859 A | 4/1997 | Schwartz et al. |
| 5,642,464 A | 6/1997 | Yue et al. |
| 5,642,519 A | 6/1997 | Martin |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,712,957 A | 1/1998 | Waibel et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,748,974 A | 5/1998 | Johnson |
| 5,790,978 A | 8/1998 | Olive et al. |
| 5,794,050 A | 8/1998 | Dahlgren et al. |
| 5,794,182 A | 8/1998 | Manduchi et al. |
| 5,799,276 A | 8/1998 | Komissarchik et al. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,860,063 A | 1/1999 | Gorin et al. |
| 5,860,064 A | 1/1999 | Henton |
| 5,864,806 A | 1/1999 | Mokbel et al. |
| 5,867,799 A | 2/1999 | Lang et al. |
| 5,873,056 A | 2/1999 | Liddy et al. |
| 5,878,396 A | 3/1999 | Henton |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,943,670 A | 8/1999 | Prager |
| 5,987,404 A | 11/1999 | Della Pietra et al. |
| 6,016,471 A | 1/2000 | Kuhn et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,064,960 A | 5/2000 | Bellegarda et al. |
| 6,081,750 A | 6/2000 | Hoffberg et al. |
| 6,088,731 A | 7/2000 | Kiraly et al. |
| 6,108,627 A | 8/2000 | Sabourin |
| 6,122,616 A | 9/2000 | Henton |
| 6,144,938 A | 11/2000 | Surace et al. |
| 6,167,369 A * | 12/2000 | Schulze ................. 704/9 |
| 6,173,261 B1 | 1/2001 | Arai et al. |
| 6,188,999 B1 | 2/2001 | Moody |
| 6,195,641 B1 | 2/2001 | Loring et al. |
| 6,208,971 B1 | 3/2001 | Bellegarda et al. |
| 6,216,102 B1 * | 4/2001 | Martino et al. ................. 704/9 |
| 6,233,559 B1 | 5/2001 | Balakrishnan |
| 6,246,981 B1 | 6/2001 | Papineni et al. |
| 6,266,637 B1 | 7/2001 | Donovan et al. |
| 6,272,456 B1 * | 8/2001 | de Campos ................. 704/8 |
| 6,285,786 B1 | 9/2001 | Seni et al. |
| 6,292,772 B1 * | 9/2001 | Kantrowitz ................. 704/9 |
| 6,308,149 B1 | 10/2001 | Gaussier et al. |

(56) References Cited

U.S. PATENT DOCUMENTS

| | | | |
|---|---|---|---|
| 6,317,594 B1 | 11/2001 | Gossman et al. | |
| 6,317,707 B1 | 11/2001 | Bangalore et al. | |
| 6,317,831 B1 | 11/2001 | King | |
| 6,321,092 B1 | 11/2001 | Fitch et al. | |
| 6,334,103 B1 | 12/2001 | Surace et al. | |
| 6,356,854 B1 | 3/2002 | Schubert et al. | |
| 6,366,883 B1 | 4/2002 | Campbell et al. | |
| 6,366,884 B1 | 4/2002 | Bellegarda et al. | |
| 6,415,250 B1* | 7/2002 | van den Akker | 704/9 |
| 6,421,672 B1 | 7/2002 | McAllister et al. | |
| 6,434,524 B1 | 8/2002 | Weber | |
| 6,446,076 B1 | 9/2002 | Burkey et al. | |
| 6,453,292 B2 | 9/2002 | Ramaswamy et al. | |
| 6,460,015 B1* | 10/2002 | Hetherington et al. | 704/8 |
| 6,466,654 B1 | 10/2002 | Cooper et al. | |
| 6,477,488 B1 | 11/2002 | Bellegarda | |
| 6,487,534 B1 | 11/2002 | Thelen et al. | |
| 6,499,013 B1 | 12/2002 | Weber | |
| 6,501,937 B1 | 12/2002 | Ho et al. | |
| 6,505,158 B1 | 1/2003 | Conkie | |
| 6,513,063 B1 | 1/2003 | Julia et al. | |
| 6,523,061 B1 | 2/2003 | Halverson et al. | |
| 6,526,395 B1 | 2/2003 | Morris | |
| 6,532,444 B1 | 3/2003 | Weber | |
| 6,532,446 B1 | 3/2003 | King | |
| 6,553,344 B2 | 4/2003 | Bellegarda et al. | |
| 6,598,039 B1 | 7/2003 | Livowsky | |
| 6,601,026 B2 | 7/2003 | Appelt et al. | |
| 6,604,059 B2 | 8/2003 | Strubbe et al. | |
| 6,615,172 B1 | 9/2003 | Bennett et al. | |
| 6,615,175 B1 | 9/2003 | Gazdzinski | |
| 6,631,346 B1 | 10/2003 | Karaorman et al. | |
| 6,633,846 B1 | 10/2003 | Bennett et al. | |
| 6,647,260 B2 | 11/2003 | Dusse et al. | |
| 6,650,735 B2 | 11/2003 | Burton et al. | |
| 6,654,740 B2 | 11/2003 | Tokuda et al. | |
| 6,665,639 B2 | 12/2003 | Mozer et al. | |
| 6,665,640 B1 | 12/2003 | Bennett et al. | |
| 6,665,641 B1 | 12/2003 | Coorman et al. | |
| 6,684,187 B1 | 1/2004 | Conkie | |
| 6,691,111 B2 | 2/2004 | Lazaridis et al. | |
| 6,691,151 B1 | 2/2004 | Cheyer et al. | |
| 6,697,780 B1 | 2/2004 | Beutnagel et al. | |
| 6,704,698 B1* | 3/2004 | Paulsen et al. | 704/1 |
| 6,735,632 B1 | 5/2004 | Kiraly et al. | |
| 6,742,021 B1 | 5/2004 | Halverson et al. | |
| 6,757,362 B1 | 6/2004 | Cooper et al. | |
| 6,757,718 B1 | 6/2004 | Halverson et al. | |
| 6,778,951 B1 | 8/2004 | Contractor | |
| 6,778,952 B2 | 8/2004 | Bellegarda | |
| 6,778,962 B1 | 8/2004 | Kasai et al. | |
| 6,792,082 B1 | 9/2004 | Levine | |
| 6,794,566 B2* | 9/2004 | Pachet | 84/600 |
| 6,807,574 B1 | 10/2004 | Partovi et al. | |
| 6,810,379 B1 | 10/2004 | Vermeulen et al. | |
| 6,813,491 B1 | 11/2004 | McKinney | |
| 6,832,194 B1 | 12/2004 | Mozer et al. | |
| 6,842,767 B1 | 1/2005 | Partovi et al. | |
| 6,847,966 B1 | 1/2005 | Sommer et al. | |
| 6,851,115 B1 | 2/2005 | Cheyer et al. | |
| 6,859,931 B1 | 2/2005 | Cheyer et al. | |
| 6,895,380 B2 | 5/2005 | Sepe, Jr. | |
| 6,895,558 B1 | 5/2005 | Loveland | |
| 6,912,499 B1 | 6/2005 | Sabourin et al. | |
| 6,928,614 B1 | 8/2005 | Everhart | |
| 6,937,975 B1 | 8/2005 | Elworthy | |
| 6,937,986 B2 | 8/2005 | Denenberg et al. | |
| 6,964,023 B2 | 11/2005 | Maes et al. | |
| 6,980,949 B2 | 12/2005 | Ford | |
| 6,980,955 B2 | 12/2005 | Okutani et al. | |
| 6,985,865 B1 | 1/2006 | Packingham et al. | |
| 6,988,071 B1 | 1/2006 | Gazdzinski | |
| 6,996,531 B2 | 2/2006 | Korall et al. | |
| 6,999,927 B2 | 2/2006 | Mozer et al. | |
| 7,020,685 B1 | 3/2006 | Chen et al. | |
| 7,027,974 B1 | 4/2006 | Busch et al. | |
| 7,035,801 B2* | 4/2006 | Jimenez-Feltstrom | 704/255 |
| 7,036,128 B1 | 4/2006 | Julia et al. | |
| 7,050,977 B1 | 5/2006 | Bennett | |
| 7,058,569 B2 | 6/2006 | Coorman et al. | |
| 7,062,428 B2 | 6/2006 | Hogenhout et al. | |
| 7,069,560 B1 | 6/2006 | Cheyer et al. | |
| 7,092,887 B2 | 8/2006 | Mozer et al. | |
| 7,092,928 B1 | 8/2006 | Elad et al. | |
| 7,093,693 B1 | 8/2006 | Gazdzinski | |
| 7,107,204 B1 | 9/2006 | Liu et al. | |
| 7,127,046 B1 | 10/2006 | Smith et al. | |
| 7,136,710 B1 | 11/2006 | Hoffberg et al. | |
| 7,137,126 B1 | 11/2006 | Coffman et al. | |
| 7,139,697 B2* | 11/2006 | Hakkinen et al. | 704/9 |
| 7,139,714 B2 | 11/2006 | Bennett et al. | |
| 7,139,722 B2 | 11/2006 | Perrella et al. | |
| 7,162,482 B1* | 1/2007 | Dunning | 707/737 |
| 7,177,798 B2 | 2/2007 | Hsu et al. | |
| 7,197,460 B1 | 3/2007 | Gupta et al. | |
| 7,200,550 B2 | 4/2007 | Menezes et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,266,496 B2 | 9/2007 | Wang et al. | |
| 7,277,854 B2 | 10/2007 | Bennett et al. | |
| 7,290,039 B1 | 10/2007 | Lisitsa et al. | |
| 7,299,033 B2 | 11/2007 | Kjellberg et al. | |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,359,851 B2* | 4/2008 | Tong et al. | 704/8 |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,418,392 B1 | 8/2008 | Mozer et al. | |
| 7,426,467 B2 | 9/2008 | Nashida et al. | |
| 7,427,024 B1 | 9/2008 | Gazdzinski et al. | |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,467,164 B2* | 12/2008 | Marsh | 1/1 |
| 7,475,010 B2 | 1/2009 | Chao | |
| 7,477,238 B2 | 1/2009 | Fux et al. | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,539,656 B2 | 5/2009 | Fratkina et al. | |
| 7,546,382 B2 | 6/2009 | Healey et al. | |
| 7,548,895 B2 | 6/2009 | Pulsipher | |
| 7,552,045 B2* | 6/2009 | Barliga et al. | 704/8 |
| 7,555,431 B2 | 6/2009 | Bennett | |
| 7,562,007 B2* | 7/2009 | Hwang | 704/8 |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |
| 7,640,160 B2 | 12/2009 | Di Cristo et al. | |
| 7,647,225 B2 | 1/2010 | Bennett et al. | |

(56) References Cited

U.S. PATENT DOCUMENTS

| | | | |
|---|---|---|---|
| 7,657,424 B2 | 2/2010 | Bennett | |
| 7,672,841 B2 | 3/2010 | Bennett | |
| 7,676,026 B1 | 3/2010 | Baxter, Jr. | |
| 7,676,365 B2* | 3/2010 | Hwang et al. | 704/240 |
| 7,680,649 B2* | 3/2010 | Park | 704/10 |
| 7,684,985 B2 | 3/2010 | Dominach et al. | |
| 7,689,408 B2* | 3/2010 | Chen et al. | 704/8 |
| 7,689,409 B2* | 3/2010 | Heinecke | 704/9 |
| 7,693,715 B2 | 4/2010 | Hwang et al. | |
| 7,693,720 B2 | 4/2010 | Kennewick et al. | |
| 7,698,131 B2 | 4/2010 | Bennett | |
| 7,702,500 B2 | 4/2010 | Blaedow | |
| 7,702,508 B2 | 4/2010 | Bennett | |
| 7,707,027 B2 | 4/2010 | Balchandran et al. | |
| 7,707,032 B2 | 4/2010 | Wang et al. | |
| 7,707,267 B2 | 4/2010 | Lisitsa et al. | |
| 7,711,565 B1 | 5/2010 | Gazdzinski | |
| 7,711,672 B2 | 5/2010 | Au | |
| 7,716,056 B2 | 5/2010 | Weng et al. | |
| 7,720,674 B2 | 5/2010 | Kaiser et al. | |
| 7,720,683 B1 | 5/2010 | Vermeulen et al. | |
| 7,725,307 B2 | 5/2010 | Bennett | |
| 7,725,318 B2 | 5/2010 | Gavalda et al. | |
| 7,725,320 B2 | 5/2010 | Bennett | |
| 7,725,321 B2 | 5/2010 | Bennett | |
| 7,729,904 B2 | 6/2010 | Bennett | |
| 7,729,916 B2 | 6/2010 | Coffman et al. | |
| 7,734,461 B2 | 6/2010 | Kwak et al. | |
| 7,752,152 B2 | 7/2010 | Paek et al. | |
| 7,774,204 B2 | 8/2010 | Mozer et al. | |
| 7,783,486 B2 | 8/2010 | Rosser et al. | |
| 7,801,729 B2 | 9/2010 | Mozer | |
| 7,809,570 B2 | 10/2010 | Kennewick et al. | |
| 7,809,610 B2 | 10/2010 | Cao | |
| 7,818,165 B2* | 10/2010 | Carlgren et al. | 704/8 |
| 7,818,176 B2 | 10/2010 | Freeman et al. | |
| 7,822,608 B2 | 10/2010 | Cross, Jr. et al. | |
| 7,826,945 B2 | 11/2010 | Zhang et al. | |
| 7,831,426 B2 | 11/2010 | Bennett | |
| 7,840,400 B2 | 11/2010 | Lavi et al. | |
| 7,840,447 B2 | 11/2010 | Kleinrock et al. | |
| 7,840,581 B2* | 11/2010 | Ross et al. | 707/758 |
| 7,873,519 B2 | 1/2011 | Bennett | |
| 7,873,654 B2 | 1/2011 | Bernard | |
| 7,881,936 B2 | 2/2011 | Longé et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,925,525 B2 | 4/2011 | Chin | |
| 7,930,168 B2 | 4/2011 | Weng et al. | |
| 7,949,529 B2 | 5/2011 | Weider et al. | |
| 7,974,844 B2 | 7/2011 | Sumita | |
| 7,974,972 B2 | 7/2011 | Cao | |
| 7,983,915 B2 | 7/2011 | Knight et al. | |
| 7,983,917 B2 | 7/2011 | Kennewick et al. | |
| 7,983,997 B2 | 7/2011 | Allen et al. | |
| 7,987,151 B2 | 7/2011 | Schott et al. | |
| 8,000,453 B2 | 8/2011 | Cooper et al. | |
| 8,005,679 B2 | 8/2011 | Jordan et al. | |
| 8,015,006 B2 | 9/2011 | Kennewick et al. | |
| 8,024,195 B2 | 9/2011 | Mozer et al. | |
| 8,036,901 B2 | 10/2011 | Mozer | |
| 8,041,570 B2 | 10/2011 | Mirkovic et al. | |
| 8,041,611 B2 | 10/2011 | Kleinrock et al. | |
| 8,055,708 B2 | 11/2011 | Chitsaz et al. | |
| 8,065,155 B1 | 11/2011 | Gazdzinski | |
| 8,065,156 B2 | 11/2011 | Gazdzinski | |
| 8,069,046 B2 | 11/2011 | Kennewick et al. | |
| 8,073,681 B2 | 12/2011 | Baldwin et al. | |
| 8,078,473 B1 | 12/2011 | Gazdzinski | |
| 8,082,153 B2 | 12/2011 | Coffman et al. | |
| 8,095,364 B2 | 1/2012 | Longé et al. | |
| 8,099,289 B2 | 1/2012 | Mozer et al. | |
| 8,107,401 B2 | 1/2012 | John et al. | |
| 8,112,275 B2 | 2/2012 | Kennewick et al. | |
| 8,112,280 B2 | 2/2012 | Lu | |
| 8,117,037 B2 | 2/2012 | Gazdzinski | |
| 8,140,335 B2 | 3/2012 | Kennewick et al. | |
| 8,165,886 B1 | 4/2012 | Gagnon et al. | |
| 8,166,019 B1 | 4/2012 | Lee et al. | |
| 8,190,359 B2 | 5/2012 | Bourne | |
| 8,195,467 B2 | 6/2012 | Mozer et al. | |
| 8,204,238 B2 | 6/2012 | Mozer | |
| 8,205,788 B1 | 6/2012 | Gazdzinski et al. | |
| 8,219,407 B1 | 7/2012 | Roy et al. | |
| 8,285,551 B2 | 10/2012 | Gazdzinski | |
| 8,285,553 B2 | 10/2012 | Gazdzinski | |
| 8,290,778 B2 | 10/2012 | Gazdzinski | |
| 8,290,781 B2 | 10/2012 | Gazdzinski | |
| 8,296,146 B2 | 10/2012 | Gazdzinski | |
| 8,296,153 B2 | 10/2012 | Gazdzinski | |
| 8,301,456 B2 | 10/2012 | Gazdzinski | |
| 8,311,834 B1 | 11/2012 | Gazdzinski | |
| 8,370,158 B2 | 2/2013 | Gazdzinski | |
| 8,371,503 B2 | 2/2013 | Gazdzinski | |
| 8,447,612 B2 | 5/2013 | Gazdzinski | |
| 2002/0032564 A1 | 3/2002 | Ehsani et al. | |
| 2002/0046025 A1 | 4/2002 | Hain | |
| 2002/0069063 A1 | 6/2002 | Buchner et al. | |
| 2002/0077817 A1 | 6/2002 | Atal | |
| 2004/0006467 A1* | 1/2004 | Anisimovich et al. | 704/251 |
| 2004/0054541 A1* | 3/2004 | Kryze et al. | 704/275 |
| 2004/0135701 A1 | 7/2004 | Yasuda et al. | |
| 2004/0138869 A1* | 7/2004 | Heinecke | 704/1 |
| 2004/0252604 A1* | 12/2004 | Johnson et al. | 369/47.22 |
| 2005/0071332 A1 | 3/2005 | Ortega et al. | |
| 2005/0080625 A1 | 4/2005 | Bennett et al. | |
| 2005/0119897 A1 | 6/2005 | Bennett et al. | |
| 2005/0143972 A1 | 6/2005 | Gopalakrishnan et al. | |
| 2005/0154578 A1* | 7/2005 | Tong et al. | 704/5 |
| 2005/0182629 A1 | 8/2005 | Coorman et al. | |
| 2005/0196733 A1 | 9/2005 | Budra et al. | |
| 2006/0018492 A1 | 1/2006 | Chiu et al. | |
| 2006/0095848 A1 | 5/2006 | Naik | |
| 2006/0122834 A1 | 6/2006 | Bennett | |
| 2006/0143007 A1 | 6/2006 | Koh et al. | |
| 2006/0168150 A1 | 7/2006 | Naik et al. | |
| 2007/0055493 A1* | 3/2007 | Lee | 704/9 |
| 2007/0055529 A1 | 3/2007 | Kanevsky et al. | |
| 2007/0058832 A1 | 3/2007 | Hug et al. | |
| 2007/0088556 A1 | 4/2007 | Andrew | |
| 2007/0100790 A1 | 5/2007 | Cheyer et al. | |
| 2007/0118377 A1* | 5/2007 | Badino et al. | 704/260 |
| 2007/0174188 A1 | 7/2007 | Fish | |
| 2007/0185917 A1 | 8/2007 | Prahlad et al. | |
| 2007/0198273 A1* | 8/2007 | Hennecke | 704/277 |
| 2007/0219777 A1* | 9/2007 | Chu et al. | 704/9 |
| 2007/0282595 A1 | 12/2007 | Tunning et al. | |
| 2008/0015864 A1 | 1/2008 | Ross et al. | |
| 2008/0021708 A1 | 1/2008 | Bennett et al. | |
| 2008/0034032 A1 | 2/2008 | Healey et al. | |
| 2008/0052063 A1 | 2/2008 | Bennett et al. | |
| 2008/0120112 A1 | 5/2008 | Jordan et al. | |
| 2008/0129520 A1 | 6/2008 | Lee | |
| 2008/0140657 A1 | 6/2008 | Azvine et al. | |
| 2008/0221880 A1* | 9/2008 | Cerra et al. | 704/235 |
| 2008/0221903 A1 | 9/2008 | Kanevsky et al. | |
| 2008/0228496 A1 | 9/2008 | Yu et al. | |
| 2008/0247519 A1 | 10/2008 | Abella et al. | |
| 2008/0249770 A1 | 10/2008 | Kim et al. | |
| 2008/0300878 A1 | 12/2008 | Bennett | |
| 2008/0312909 A1* | 12/2008 | Hermansen et al. | 704/9 |
| 2009/0006097 A1* | 1/2009 | Etezadi et al. | 704/260 |
| 2009/0006100 A1 | 1/2009 | Badger et al. | |
| 2009/0006343 A1 | 1/2009 | Platt et al. | |
| 2009/0030800 A1 | 1/2009 | Grois | |
| 2009/0058823 A1 | 3/2009 | Kocienda | |
| 2009/0076796 A1 | 3/2009 | Daraselia | |
| 2009/0100049 A1 | 4/2009 | Cao | |
| 2009/0112677 A1 | 4/2009 | Rhett | |
| 2009/0150156 A1 | 6/2009 | Kennewick et al. | |
| 2009/0157401 A1 | 6/2009 | Bennett | |
| 2009/0164441 A1 | 6/2009 | Cheyer | |

(56) References Cited

U.S. PATENT DOCUMENTS

| | | |
|---|---|---|
| 2009/0171664 A1 | 7/2009 | Kennewick et al. |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0306985 A1* | 12/2009 | Roberts et al. ............... 704/258 |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0144999 A1 | 6/2011 | Jang et al. |
| 2011/0161076 A1 | 6/2011 | Davis et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0271676 A1 | 10/2012 | Aravamudan et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 1245023 A1 | 10/2002 |
| JP | 06 019965 | 1/1994 |
| JP | 2001 125896 | 5/2001 |
| JP | 2002 024212 | 1/2002 |
| JP | 2003517158 A | 5/2003 |
| JP | 2009 036999 | 2/2009 |
| KR | 10-0776800 B1 | 11/2007 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10 2011 0113414 A | 10/2011 |
| WO | 2006133571 A1 | 12/2006 |
| WO | WO 2006/129967 A1 | 12/2006 |
| WO | WO 2011/088053 A2 | 7/2011 |

OTHER PUBLICATIONS

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.

*Phoenix Solutions, Inc. v. West Interactive Corp.*, Document 40, Declaration of Christopher Schmandt Regarding the MIT Galaxy System dated Jul. 2, 2010, 162 pages.

Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, © 1994 IEEE, 9 pages.

Acero, A., et al., "Environmental Robustness in Automatic Speech Recognition," International Conference on Acoustics, Speech, and Signal Processing (ICASSP'90), Apr. 3-6, 1990, 4 pages.

Acero, A., et al., "Robust Speech Recognition by Normalization of the Acoustic Space," International Conference on Acoustics, Speech, and Signal Processing, 1991, 4 pages.

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.

Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.

Anastasakos, A., et al., "Duration Modeling in Large Vocabulary Speech Recognition," International Conference on Acoustics, Speech, and Signal Processing (ICASSP'95), May 9-12, 1995, 4 pages.

Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.

(56) References Cited

OTHER PUBLICATIONS

Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al,, "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., Ed, Directions and Challenges,15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.

(56) References Cited

OTHER PUBLICATIONS

Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP—91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The Sphinx System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP—93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP—92, Mar. 23-26, 1992, 4 pages.
Logan, B., "Mel Frequency Cepstral Coefficients for Music Modeling," In International Symposium on Music Information Retrieval, 2000, 2 pages.
Lowerre, B. T., "The-HARPY Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.
Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages.
Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.
Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based $N$-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/downloadsexceeded.html, 21 pages.

(56) References Cited

OTHER PUBLICATIONS

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration—Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.

Sheth B., et al., "Evolving Agents for Personalized Information Filtering," In Proceedings of the Ninth Conference on Artificial Intelligence for Applications, Mar. 1-5, 1993, 9 pages.

Shikano, K., et al., "Speaker Adaptation Through Vector Quantization," IEEE International Conference on Acoustics, Speech, and Signal Processing (ICASSP'86), vol. 11, Apr. 1986, 4 pages.

Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.

Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.

Tenenbaum, A.M., et al., "Data Structure Using Pascal," 1981 Prentice-Hall, Inc., 34 pages.

Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.

Udell, J., "Computer Telephony," Byte, vol. 19, No. 7, Jul. 1, 1994, 9 pages.

van Santen, J. P. H., "Contextual Effects on Vowel Duration," Journal Speech Communication, vol. 11, No. 6, Dec. 1992, 34 pages.

Vepa, J., et al., "New Objective Distance Measures for Spectral Discontinuities in Concatenative Speech Synthesis," In Proceedings of the IEEE 2002 Workshop on Speech Synthesis, 4 pages.

Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.

Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.

Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.

Wikipedia, "Mel Scale," Wikipedia, the free encyclopedia, http://en.wikipedia.org/wiki/Mel_scale, 2 pages.

Wikipedia, "Minimum Phase," Wikipedia, the free encyclopedia, http://en.wikipedia.org/wiki/Minimum_phase, 8 pages.

Wolff, M., "Poststructuralism and the ARTFUL Database: Some Theoretical Considerations," Information Technology and Libraries, vol. 13, No. 1, Mar. 1994, 10 pages.

Wu, M., "Digital Speech Processing and Coding," ENEE408G Capstone-Multimedia Signal Processing, Spring 2003, Lecture-2 course presentation, University of Maryland, College Park, 8 pages.

Wu, M., "Speech Recognition, Synthesis, and H.C.I.," ENEE408G Capstone-Multimedia Signal Processing, Spring 2003, Lecture-3 course presentation, University of Maryland, College Park, 11 pages.

Wyle, M. F., "A Wide Area Network Information Filter," In Proceedings of First International Conference on Artificial Intelligence on Wall Street, Oct. 9-11, 1991, 6 pages.

Yankelovich, N., et al., "Intermedia: The Concept and the Construction of a Seamless Information Environment," Computer Magazine, Jan. 1988, © 1988 IEEE, 16 pages.

Yoon, K., et al., "Letter-to-Sound Rules for Korean," Department of Linguistics, The Ohio State University, 2002, 4 pages.

Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.

Zovato, E., et al., "Towards Emotional Speech Synthesis: A Rule Based Approach," 2 pages.

International Search Report dated Nov. 9, 1994, received in International Application No. PCT/US1993/12666, which corresponds to U.S. Appl. No. 07/999,302, 8 pages (Robert Don Strong).

International Preliminary Examination Report dated Mar. 1, 1995, received in International Application No. PCT/US1993/12666, which corresponds to U.S. Appl. No. 07/999,302, 5 pages (Robert Don Strong).

International Preliminary Examination Report dated Apr. 10, 1995, received in International Application No. PCT/US1993/12637, which corresponds to U.S. Appl. No. 07/999,354, 7 pages (Alejandro Acero).

International Search Report dated Feb. 8, 1995, received in International Application No. PCT/US1994/11011, which corresponds to U.S. Appl. No. 08/129,679, 7 pages (Yen-Lu Chow).

International Preliminary Examination Report dated Feb. 28, 1996, received in International Application No. PCT/US1994/11011, which corresponds to U.S. Appl. No. 08/129,679, 4 pages (Yen-Lu Chow).

(56) References Cited

OTHER PUBLICATIONS

Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask for," Feb. 9, 2012, http://www.psfk.com/2012/02/multimedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Elio, R. et al., "On Abstract Task Models and Conversation Policies," http://webdocs.cs.ualberta.ca/~ree/publications/papers2/ATS.AA99.pdf, 10 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.conn/20110718/alfred-app-gives-personalized-restaurant-recommendations!, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.
Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.
Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.
Gruber, T. R., "Where the Social Web meets the Semantic Web," Presentation at the 5th International Semantic Web Conference, Nov. 7, 2006, 38 pages.
Gruber, T. R., "Despite our Best Efforts, Ontologies are not the Problem," AAAI Spring Symposium, Mar. 2008, http://tomgruber.org/writing/aaai-ss08.htm, 40 pages.
Gruber, T. R., "Enterprise Collaboration Management with Intraspect," Intraspect Software, Inc., Instraspect Technical White Paper Jul. 2001, 24 pages.
Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.
Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.
Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.
Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.
Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.
Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.
Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.
Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

(56) References Cited

OTHER PUBLICATIONS

Gruber, T. R., et al.,"NIKE: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.
Gruber, T. R., "TagOntology," Presentation to Tag Camp, www.tagcamp.org, Oct. 29, 2005, 20 pages.
Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.
Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.
Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "SHADE: Technology for Knowledge-Based Collaborative Engineering," 1993, Journal of Concurrent Engineering: Applications and Research (CERA), 18 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, http://tomgruber.org/writing/ksl-95-69.pdf, 14 pages.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http:// www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube,"Send Text, Listen to and Send E-Mail 'By Voice' www.voiceassist.com," 2:11 minute video uploaded to YouTube by VoiceAssist on Jul 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.

(56) References Cited

OTHER PUBLICATIONS

International Search Report and Written Opinion dated Nov. 29, 2011, received in International Application No. PCT/US2011/20861, which corresponds to U.S. Appl. No. 12/987,982, 15 pages (Thomas Robert Gruber).

Bussler, C., et al., "Web Service Execution Environment (WSMX)," Jun. 3, 2005, W3C Member Submission, http://www.w3.org/Submission/WSMX, 29 pages.

Cheyer, A., "About Adam Cheyer," Sep. 17, 2012, http://www.adam.cheyer.com/about.html, 2 pages.

Cheyer, A., "A Perspective on AI & Agent Technologies for SCM," VerticalNet, 2001 presentation, 22 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.

Roddy, D., et al., "Communication and Collaboration in a Landscape of B2B eMarketplaces," VerticalNet Solutions, white paper, Jun. 15, 2000, 24 pages.

\* cited by examiner

SYSTEMS AND METHODS OF DETECTING LANGUAGE AND NATURAL LANGUAGE STRINGS FOR TEXT TO SPEECH SYNTHESIS

FIELD OF THE INVENTION

This relates to systems and methods for synthesizing audible speech from text.

BACKGROUND OF THE DISCLOSURE

Today, many popular electronic devices, such as personal digital assistants ("PDAs") and hand-held media players or portable electronic devices ("PEDs"), are battery powered and include various user interface components. Conventionally, such portable electronic devices include buttons, dials, or touchpads to control the media devices and to allow users to navigate through media assets, including, e.g., music, speech, or other audio, movies, photographs, interactive art, text, etc., resident on (or accessible through) the media devices, to select media assets to be played or displayed, and/or to set user preferences for use by the media devices. The functionality supported by such portable electronic devices is increasing. At the same time, these media devices continue to get smaller and more portable. Consequently, as such devices get smaller while supporting robust functionality, there are increasing difficulties in providing adequate user interfaces for the portable electronic devices.

Some user interfaces have taken the form of graphical user interfaces or displays which, when coupled with other interface components on the device, allow users to navigate and select media assets and/or set user preferences. However, such graphical user interfaces or displays may be inconvenient, small, or unusable. Other devices have completely done away with a graphical user display.

One problem encountered by users of portable devices that lack a graphical display relates to difficulty in identifying the audio content being presented via the device. This problem may also be encountered by users of portable electronic devices that have a graphical display, for example, when the display is small, poorly illuminated, or otherwise unviewable.

Thus, there is a need to provide users of portable electronic devices with non-visual identification of media content delivered on such devices.

SUMMARY OF THE DISCLOSURE

Embodiments of the invention provide audible human speech that may be used to identify media content delivered on a portable electronic device, and that may be combined with the media content such that it is presented during display or playback of the media content. Such speech content may be based on data associated with, and identifying, the media content by recording the identifying information and combining it with the media content. For such speech content to be appealing and useful for a particular user, it may be desirable for it to sound as if it were spoken in normal human language, in an accent that is familiar to the user.

One way to provide such a solution may involve use of speech content that is a recording of an actual person's reading of the identifying information. However, in addition to being prone to human error, this approach would require significant resources in terms of dedicated man-hours, and may be too impractical for use in connection with distributing media files whose numbers can exceed hundreds of thousands, millions, or even billions. This is especially true for new songs, podcasts, movies, television shows, and other media items that are all made available for downloading in huge quantities every second of every day across the entire globe.

Accordingly, processors may alternatively be used to synthesize speech content by automatically extracting the data associated with, and identifying, the media content and converting it into speech. However, most media assets are typically fixed in content (i.e., existing personal media players do not typically operate to allow mixing of additional audio while playing content from the media assets). Moreover, existing portable electronic devices are not capable of synthesizing such natural-sounding high-quality speech. Although one may contemplate modifying such media devices so as to be capable of synthesizing and mixing speech with an original media file, such modification would include adding circuitry, which would increase the size and power consumption of the device, as well as negatively impact the device's ability to instantaneously playback media files.

Thus, other resources that are separate from the media devices may be contemplated in order to extract data identifying media content, synthesize it into speech, and mix the speech content with the original media file. For example, a computer that is used to load media content onto the device, or any other processor that may be connected to the device, may be used to perform the speech synthesis operation.

This may be implemented through software that utilizes processing capabilities to convert text data into synthetic speech. For example, such software may configure a remote server, a host computer, a computer that is synchronized with the media player, or any other device having processing capabilities, to convert data identifying the media content and output the resulting speech. This technique efficiently leverages the processing resources of a computer or other device to convert text strings into audio files that may be played back on any device. The computing device performs the processor intensive text-to-speech conversion so that the media player only needs to perform the less intensive task of playing the media file. These techniques are described in commonly-owned, co-pending patent application Ser. No. 10/981,993, filed on Nov. 4, 2004 (now U.S. Published Patent Application No. 2006/0095848), which is hereby incorporated by reference herein in its entirety.

However, techniques that rely on automated processor operations for converting text to speech are far from perfect, especially if the goal is to render accurate, high quality, normal human language sounding speech at fast rates. This is because text can be misinterpreted, characters can be falsely recognized, and the process of providing such rendering of high quality speech is resource intensive.

Moreover, users who download media content are nationals of all countries, and thus speak in different languages, dialects, or accents. Thus, speech based on a specific piece of text that identifies media content may be articulated to sound in what is almost an infinite number of different ways, depending on the native tongue of a speaker who is being emulated during the text-to-speech conversion. Making speech available in languages, dialects, or accents that sound familiar to any user across the globe is desirable if the product or service that is being offered is to be considered truly international. However, this adds to the challenges in designing automated text-to-speech synthesizers without sacrificing accuracy, quality, and speed.

Accordingly, an embodiment of the invention may provide a user of portable electronic devices with an audible recording for identifying media content that may be accessible through such devices. The audible recording may be provided for an existing device without having to modify the device, and may be provided at high and variable rates of speed. The audible recording may be provided in an automated fashion that does not require human recording of identifying information. The audible recording may also be provided to users across the globe in languages, dialects, and accents that sound familiar to these users.

Embodiments of the invention may be achieved using systems and methods for synthesizing text to speech that helps identify content in media assets using sophisticated text-to-speech algorithms. Speech may be selectively synthesized from text strings that are typically associated with, and that identify, the media assets. Portions of these strings may be normalized by substituting certain non-alphabetical characters with their most likely counterparts using, for example, (i) handwritten heuristics derived from a domain-script's knowledge, (ii) text-rewrite rules that are automatically or semi-automatically generated using 'machine learning' algorithms, or (iii) statistically trained probabilistic methods, so that they are more easily converted into human sounding speech. Such text strings may also originate in one or more native languages and may need to be converted into one or more other target languages that are familiar to certain users. In order to do so, the text's native language may be determined automatically from an analysis of the text. One way to do this is using N-gram analysis at the word and/or character levels. A first set of phonemes corresponding to the text string in its native language may then be obtained and converted into a second set of phonemes in the target language. Such conversion may be implemented using tables that map phonemes in one language to another according to a set of predetermined rules that may be context sensitive. Once the target phonemes are obtained, they may be used as a basis for providing a high quality, human-sounding rendering of the text string that is spoken in an accent or dialect that is familiar to a user, no matter the native language of the text or the user.

In order to produce such sophisticated speech at high rates and provide it to users of existing portable electronic devices, the above text-to-speech algorithms may be implemented on a server farm system. Such a system may include several rendering servers having render engines that are dedicated to implement the above algorithms in an efficient manner. The server farm system may be part of a front end that includes storage on which several media assets and their associated synthesized speech are stored, as well as a request processor for receiving and processing one or more requests that result in providing such synthesized speech. The front end may communicate media assets and associated synthesized speech content over a network to host devices that are coupled to portable electronic devices on which the media assets and the synthesized speech may be played back.

An embodiment is provided for a method for determining a native language of a text string associated with a media asset, the method comprising: undergoing one or more N-gram analyses at a word level to determine a plurality of probabilities of occurrence, each of which correspond to a probability of occurrence of the text string in a particular language, wherein the probability of occurrence of the text string in the particular language is based partly on a type of text string associated with the media asset; and determining that the native language of the text string is a language that is associated with the highest probability of occurrence out of the plurality of probabilities of occurrence.

BRIEF DESCRIPTION OF THE DRAWINGS

The above and other embodiments of the invention will be apparent upon consideration of the following detailed description, taken in conjunction with accompanying drawings, in which like reference characters refer to like parts throughout, and in which.

DETAILED DESCRIPTION OF THE DISCLOSURE

The invention relates to systems and methods for providing speech content that identifies a media asset through speech synthesis. The media asset may be an audio item such a music file, and the speech content may be an audio file that is combined with the media asset and presented before or together with the media asset during playback. The speech content may be generated by extracting metadata associated with and identifying the media asset, and by converting it into speech using sophisticated text-to-speech algorithms that are described below.

Speech content may be provided by user interaction with an on-line media store where media assets can be browsed, searched, purchased and/or acquired via a computer network. Alternatively, the media assets may be obtained via other sources, such as local copying of a media asset, such as a CD or DVD, a live recording to local memory, a user composition, shared media assets from other sources, radio recordings, or other media assets sources. In the case of a music file, the speech content may include information identifying the artist, performer, composer, title of song/composition, genre, personal preference rating, playlist name, name of album or compilation to which the song/composition pertains, or any combination thereof or of any other metadata that is associated with media content. For example, when the song is played on the media device, the title and/or artist information can be announced in an accent that is familiar to the user before the song begins. The invention may be implemented in numerous ways, including, but not limited to systems, methods, and/or computer readable media.

Several embodiments of the invention are discussed below with reference to FIGS. 1-8. However, those skilled in the art will readily appreciate that the detailed description provided herein with respect to these figures is for explanatory purposes and that the invention extends beyond these limited embodiments. For clarity, dotted lines and boxes in these figures represent events or steps that may occur under certain circumstances.

Figure 1:
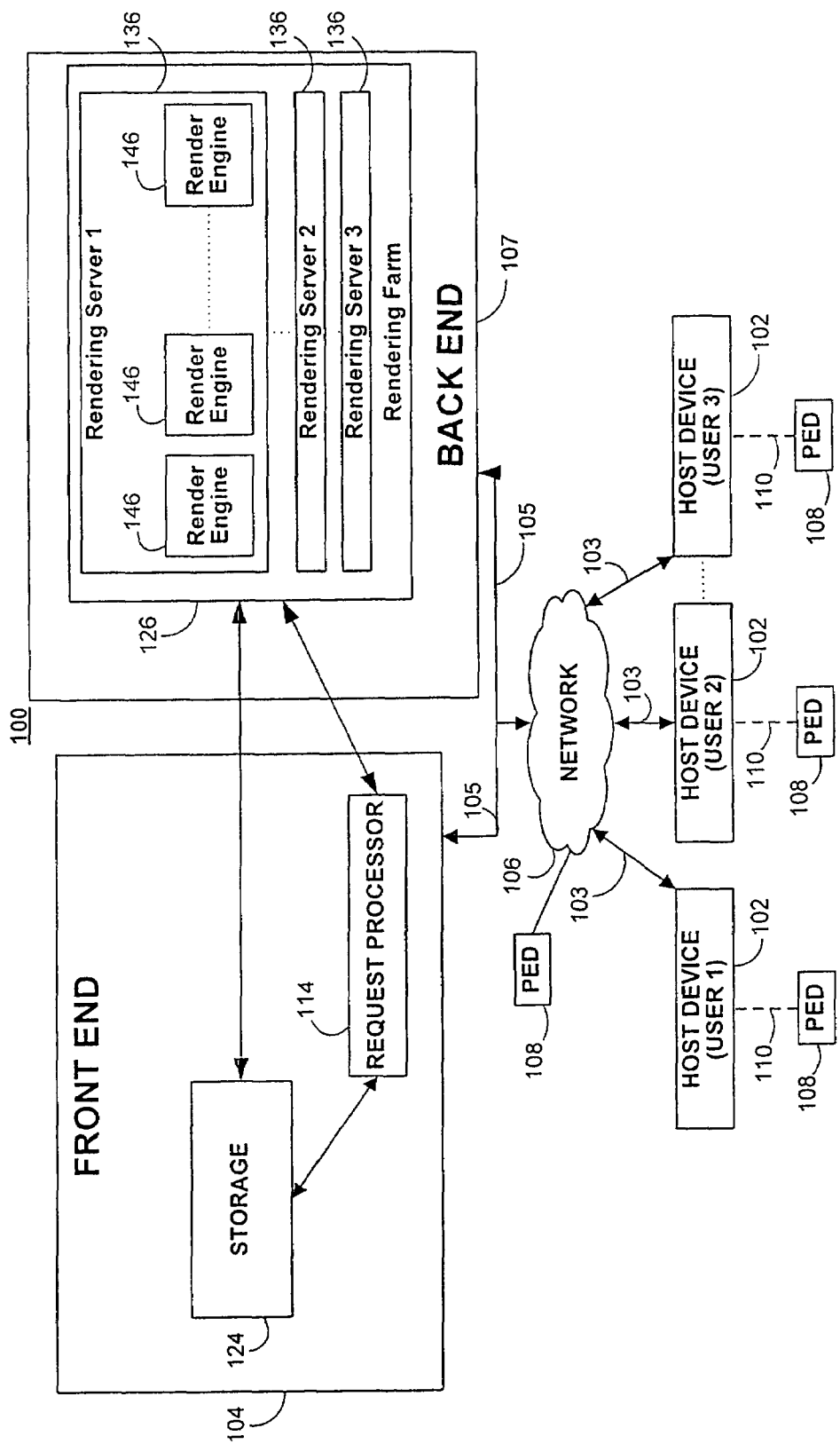
FIG. 1 is an illustrative schematic view of a text-to-speech system in accordance with certain embodiments of the invention.

FIG. 1 is a block diagram of a media system 100 that supports text-to-speech synthesis and speech content provision according to some embodiments of the invention. Media system 100 may include several host devices 102, back end 107, front end 104, and network 106. Each host device 102 may be associated with a user and coupled to one or more portable electronic devices ("PEDs") 108. PED 108 may be coupled directly or indirectly to the network 106.

The user of host device 102 may access front end 104 (and optionally back end 107) through network 106. Upon accessing front end 104, the user may be able to acquire digital media assets from front end 104 and request that such media be provided to host device 102. Here, the user can request the digital media assets in order to purchase, preview, or otherwise obtain limited rights to them.

Figure 6:
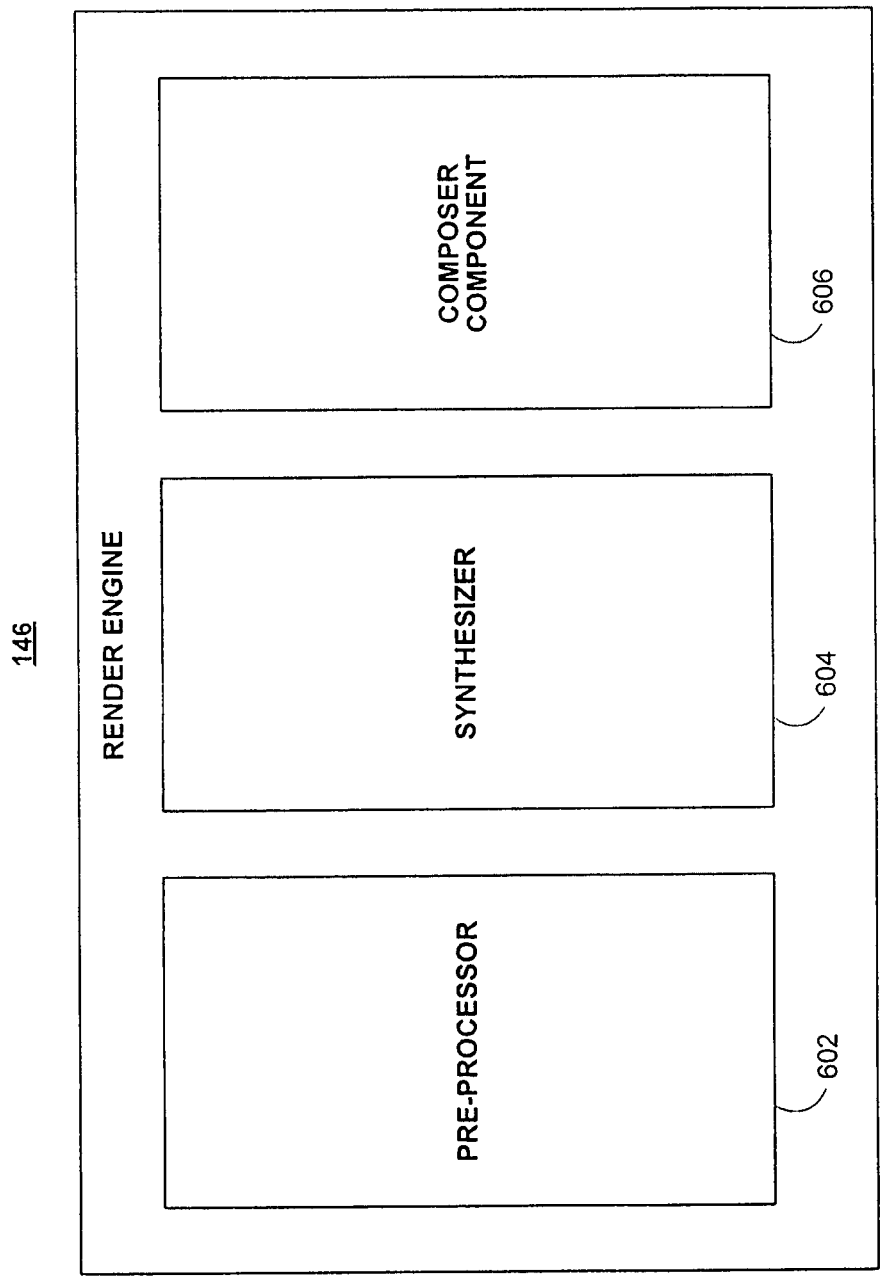
FIG. 6 is an illustrative block diagram of a render engine in accordance with certain embodiments of the invention.

Front end 104 may include request processor 114, which can receive and process user requests for media assets, as well as storage 124. Storage 124 may include a database in which several media assets are stored, along with synthesized speech content identifying these assets. A media asset and speech content associated with that particular asset may be stored as part of or otherwise associated with the same file. Back end 107 may include rendering farm 126, which functions may include synthesizing speech from the data (e.g., metadata) associated with and identifying the media asset. Rendering farm 126 may also mix the synthesized speech with the media asset so that the combined content may be sent to storage 124. Rendering farm 126 may include one or more rendering servers 136, each of which may include one or multiple instances of render engines 146, details of which are shown in FIG. 6 and discussed further below.

Host device 102 may interconnect with front end 104 and back end 107 via network 106. Network 106 may be, for example, a data network, such as a global computer network (e.g., the World Wide Web). Network 106 may be a wireless network, a wired network, or any combination of the same.

Any suitable circuitry, device, system, or combination of these (e.g., a wireless communications infrastructure including communications towers and telecommunications servers) operative to create a communications network may be used to create network 106. Network 106 may be capable of providing communications using any suitable communications protocol. In some embodiments, network 106 may support, for example, traditional telephone lines, cable television, Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof.

In some embodiments of the invention, network 106 may support protocols used by wireless and cellular telephones and personal e-mail devices (e.g., an iPhone™ available by Apple Inc. of Cupertino, Calif.). Such protocols can include, for example, GSM, GSM plus EDGE, CDMA, quadband, and other cellular protocols. In another example, a long range communications protocol can include Wi-Fi™ and protocols for placing or receiving calls using voice-over-internet protocols ("VOIP") or local area network ("LAN") protocols. In other embodiments, network 106 may support protocols used in wired telephone networks. Host devices 102 may connect to network 106 through a wired and/or wireless manner using bidirectional communications paths 103 and 105.

Portable electronic device 108 may be coupled to host device 102 in order to provide digital media assets that are present on host device 102 to portable electronic device 108. Portable electronic device 108 can couple to host device 102 over link 110. Link 110 may be a wired link or a wireless link. In certain embodiments, portable electronic device 108 may be a portable media player. The portable media player may be battery-powered and handheld and may be able to play music and/or video content. For example, portable electronic device 108 may be a media player such as any personal digital assistant ("PDA"), music player (e.g., an iPod™ Shuffle, an iPod™ Nano, or an iPod™ Touch available by Apple Inc. of Cupertino, Calif.), a cellular telephone (e.g., an iPhone™), a landline telephone, a personal e-mail or messaging device, or combinations thereof.

Host device 102 may be any communications and processing device that is capable of storing media that may be accessed through media device 108. For example, host device 102 may be a desktop computer, a laptop computer, a personal computer, or a pocket-sized computer.

A user can request a digital media asset from front end 104. The user may do so using iTunes™ available from Apple Inc., or any other software that may be run on host device 102 and that can communicate user requests to front end 104 through network 106 using links 103 and 105. In doing so, the request that is communicated may include metadata associated with the desired media asset and from which speech content may be synthesized using front end 104. Alternatively, the user can merely request from front end 104 speech content associated with the media asset. Such a request may be in the form of an explicit request for speech content or may be automatically triggered by a user playing or performing another operation on a media asset that is already stored on host device 102.

Once request processor 114 receives a request for a media asset or associated speech content, request processor 114 may verify whether the requested media asset and/or associated speech content is available in storage 124. If the requested content is available in storage 124, the media asset and/or associated speech content may be sent to request processor 114, which may relay the requested content to host device 102 through network 106 using links 105 and 103 or to a PED 108 directly. Such an arrangement may avoid duplicative operation and minimize the time that a user has to wait before receiving the desired content.

If the request was originally for the media asset, then the asset and speech content may be sent as part of a single file, or a package of files associated with each other, whereby the speech content can be mixed into the media content. If the request was originally for only the speech content, then the speech content may be sent through the same path described above. As such, the speech content may be stored together with (i.e., mixed into) the media asset as discussed herein, or it may be merely associated with the media asset (i.e., without being mixed into it) in the database on storage 124.

As described above, the speech and media contents may be kept separate in certain embodiments (i.e., the speech content may be transmitted in a separate file from the media asset). This arrangement may be desirable when the media asset is readily available on host device 102 and the request made to front end 104 is a request for associated speech content. The speech content may be mixed into the media content as described in commonly-owned, co-pending patent application Ser. No. 11/369,480, filed on Mar. 6, 2006 (now U.S.

Published Patent Application No. 2006-0168150), which is hereby incorporated herein in its entirety.

Mixing the speech and media contents, if such an operation is to occur at all, may take place anywhere within front end 104, on host computer 102, or on portable electronic device 108. Whether or not the speech content is mixed into the media content, the speech content may be in the form of an audio file that is uncompressed (e.g., raw audio). This results in high-quality audio being stored in front end 104 of FIG. 1. A lossless compression scheme may then be used to transmit the speech content over network 106. The received audio may then be uncompressed at the user end (e.g., on host device 102 or portable electronic device 108). Alternatively, the resulting audio may be stored in a format similar to that used for the media file with which it is associated.

If the speech content associated with the requested media asset is not available in storage 124, request processor 114 may send the metadata associated with the requested media asset to rendering farm 126 so that rendering farm 126 can synthesize speech therefrom. Once the speech content is synthesized from the metadata in rendering farm 126, the synthesized speech content may be mixed with the corresponding media asset. Such mixing may occur in rendering farm 126 or using other components (not shown) available in front end 104. In this case, request processor 114 may obtain the asset from storage 124 and communicate it to rendering farm or to whatever component is charged with mixing the asset with the synthesized speech content. Alternatively, rendering farm 126, or an other component, may communicate directly with storage 124 in order to obtain the asset with which the synthesized speech is to be mixed. In other embodiments, request processor 114 may be charged with such mixing.

From the above, it may be seen that speech synthesis may be initiated in response to a specific request from request processor 114 in response to a request received from host device 102. On the other hand, speech synthesis may be initiated in response to continuous addition of media assets onto storage 124 or in response to a request from the operator of front end 104. Such an arrangement may ensure that the resources of rendering farm 126 do not go unused. Moreover, having multiple rendering servers 136 with multiple render engines 146 may avoid any delays in providing synthesized speech content should additional resources be needed in case multiple requests for synthesized speech content are initiated simultaneously. This is especially true as new requests are preferably diverted to low-load servers or engines. In other embodiments of the invention, speech synthesis, or any portion thereof as shown in FIGS. 2-5 and 7-8 or as described further in connection with any of the processes below, may occur at any other device in network 106, on host device 102, or on portable electronic device 108, assuming these devices are equipped with the proper resources to handle such functions. For example, any or all portions shown in FIG. 6 may be incorporated into these devices.

To ensure that storage 124 does not overflow with content, appropriate techniques may be used to prioritize what content is deleted first and when such content is deleted. For example, content can be deleted on a first-in-first-out basis, or based on the popularity of content, whereby content that is requested with higher frequency may be assigned a higher priority or remain on storage 124 for longer periods of time than content that is requested with less frequency. Such functionality may be implemented using fading memories and time-stamping mechanisms, for example.

The following figures and description provide additional details, embodiments, and implementations of text-to-speech processes and operations that may be performed on text (e.g., titles, authors, performers, composers, etc.) associated with media assets (e.g., songs, podcasts, movies, television shows, audio books, etc.). Often, the media assets may include audio content, such as a song, and the associated text from which speech may be synthesized may include a title, author, performer, composers, genre, beats per minute, and the like. Nevertheless, as described above, it should be understood that neither the media asset nor the associated text is limited to audio data, and that like processing and operations can be used with other time-varying media types besides music such as podcasts, movies, television shows, and the like, as well as static media such as photographs, electronic mail messages, text documents, and other applications that run on the PED 108 or that may be available via an application store.

Figure 2:
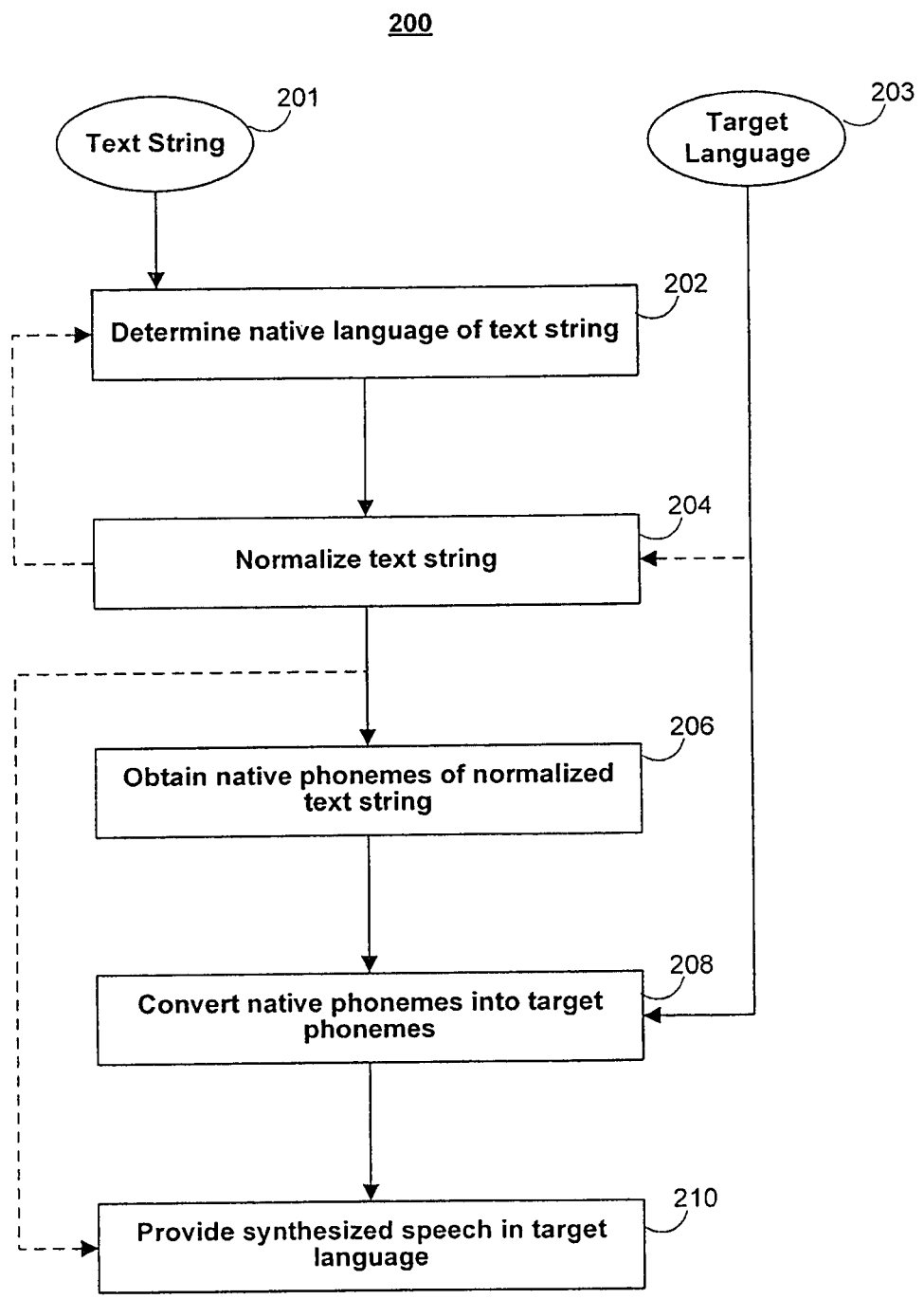
FIG. 2 is a flowchart of an illustrative process for generally providing text-to-speech synthesis in accordance with certain embodiments of the invention.

FIG. 2 is a flow diagram of a full text-to-speech conversion process 200 that may be implemented in accordance with certain embodiments of the invention. Each one of the steps in process 200 is described and illustrated in further detail in the description and other figures herein.

The first step in process 200 is the receipt of the text string to be synthesized into speech starting at step 201. Similarly, at step 203, the target language which represents the language or dialect in which the text string will be vocalized is received. The target language may be determined based on the request by the user for the media content and/or the associated speech content. The target language may or may not be utilized until step 208. For example, the target language may influence how text is normalized at step 204, as discussed further below in connection with FIG. 4.

As described above in connection with FIG. 1, the request that is communicated to rendering farm 126 (from either a user of host device 102 or the operator of front end 104) may include the text string (to be converted or synthesized to speech), which can be in the form of metadata. The same request may also include information from which the target language may be derived. For example, the user may enter the target language as part of the request. Alternatively, the language in which host device 102 (or the specific software and/or servers that handle media requests, such as iTunes™) is configured may be communicated to request processor 114 software. As another example, the target language may be set by the user through preference settings and communicated to front end 104. Alternatively, the target language may be fixed by front end 104 depending on what geographic location is designated to be serviced by front end 104 (i.e., where the request for the media or speech content is generated or received). For example, if a user is interacting with a German store front, request processor 114 may set the target language to be German.

At step 202 of process 200, the native language of the text string (i.e., the language in which the text string has originated) may be determined. For example, the native language of a text string such as "La Vie En Rose," which refers to the title of a song, may be determined to be French. Further details on step 202 are provided below in connection with FIG. 3. At step 204, the text string may be normalized in order to, for example, expand abbreviations so that the text string is more easily synthesized into human sounding speech. For example, text such as "U2," which refers to the name of an artist (rock music band), would be normalized to be "you two." Further details on step 204 are provided below in connection with FIG. 4. Steps 202 and 204 may be performed using any one of render engines 146 of FIG. 1. More specifically, pre-processor 602 of FIG. 6 may be specifically dedicated to performing steps 202 and/or 204.

With respect to FIG. 2, step 202 may occur before step 204. Alternatively, process 200 may begin with step 204, whereby step 202 occurs thereafter. Portions of process 200 may be iterative as denoted by the dotted line arrow, in conjunction with the solid line arrow, between steps 202 and 204. More specifically, steps 202 and 204 may occur several times, one after the other in a cyclical, repetitive manner until the desired result is obtained. The combination of steps 202 and 204 may result in a normalized text string having a known native language or language of origin.

After steps 202 and 204 of process 200 have occurred, the normalized text string may be used to determine a pronunciation of the text string in the target language at steps 206 and 208. This determination may be implemented using a technique that may be referred to as phoneme mapping, which may be used in conjunction with a table look up. Using this technique, one or more phonemes corresponding to the normalized text may be obtained in the text's native language at step 206. Those obtained phonemes are used to provide pronunciation of the phonemes in the target language at step 208. A phoneme is a minimal sound unit of speech that, when contrasted with another phoneme, affects the naming of words in a particular language. It is typically the smallest unit of sound that, when contrasted with another phoneme, affects the naming of words in a language. For example, the sound of the character "r" in the words "red," "bring," or "round" is a phoneme. Further details on steps 206 and 208 are provided below in connection with FIG. 5.

It should be noted that certain normalized texts need not need a pronunciation change from one language to another, as indicated by the dotted line arrow bypassing steps 206 and 208. This may be true for text having a native language that corresponds to the target language. Alternatively, a user may wish to always hear text spoken in its native language, or may want to hear text spoken in its native language under certain conditions (e.g., if the native language is a language that is recognized by the user because it is either common or merely a different dialect of the user's native language). Otherwise, the user may specify conditions under which he or she would like to hear a version of the text pronounced in a certain language, accent, dialect, etc. These and other conditions may be specified by the user through preference settings and communicated to front end 104 of FIG. 1. In situations where a pronunciation change need not take place, steps 202 through 208 may be entirely skipped.

Other situations may exist in which certain portions of text strings may be recognized by the system and may not, as a result, undergo some or all of steps 202 through 208. Instead, certain programmed rules may dictate how these recognized portions of text ought to be spoken such that when these portions are present, the same speech is rendered without having to undergo natural language detection, normalization, and/or phoneme mapping under certain conditions. For example, rendering farm 126 of FIG. 1 may be programmed to recognize certain text strings that correspond to names of artists/composers, such as "Ce Ce Peniston" and may instruct a composer component 606 of FIG. 6 to output speech according to the correct (or commonly-known) pronunciation of this name. Similarly, with respect to song titles, certain prefixes or suffixes such as "Dance Remix," "Live," "Acoustic," "Version," and the like may also be recognized and rendered according to predefined rules. This may be one form of selective text-to-speech synthesis. The composer component 606, further described herein, may be a component of render engine 146 (FIG. 1) used to output actual speech based on a text string and phonemes, as described herein.

There may be other forms of selective text-to-speech synthesis that are implemented according to certain embodiments of the invention. For example, certain texts associated with media assets may be lengthy and users may not be interested in hearing a rendering of the entire string. Thus, only selected potions of texts may be synthesized based on certain rules. For example, pre-processor 602 of FIG. 6 may parse through text strings and select certain subsets of text to be synthesized or not to be synthesized. Thus, certain programmed rules may dictate which strings are selected or rejected. Alternatively, such selection may be manually implemented (i.e., such that individuals known as scrubbers may go through strings associated with media assets and decide, while possibly rewriting portions of, the text strings to be synthesized). This may be especially true for subsets of which may be small in nature, such as classical music, when compared to other genres.

One embodiment of selective text to speech synthesis may be provided for classical music (or other genres of) media assets that filters associated text and/or provides substitutions for certain fields of information. Classical music may be particularly relevant for this embodiment because composer information, which may be classical music's most identifiable aspect, is typically omitted in associated text. As with other types of media assets, classical music is typically associated with name and artist information, however, the name and artist information in the classical music genre is often irrelevant and uninformative.

The methods and techniques discussed herein with respect to classical music may also be broadly applied to other genres, for example, in the context of selecting certain associated text for use in speech synthesis, identifying or highlighting certain associated text, and other uses. For example, in a hip hop media asset, more than one artist may be listed in its associated text. Techniques described herein may be used to select one or more of the listed artists to be highlighted in a text string for speech synthesis. In another example, for a live music recording, techniques described herein may be used to identify a concert date, concert location, or other information that may be added or substituted in a text string for speech synthesis. Obviously, other genres and combinations of selected information may also use these techniques.

In a more specific example, a classical music recording may be identified using the following name: "Organ Concerto in B-Flat Major Op. 7, No. 1 (HWV 306): IV. Adagio ad libitum (from Harpsichord Sonata in G minor HHA IV, 17 No. 22, Larghetto)." A second classical music recording may be identified with the following artist: "Bavarian Radio Chorus, Dresden Philharmonic Childrens Chorus, Jan-Hendrik Rootering, June Anderson, Klaus Knig, Leningrad Members of the Kirov Orchestra, Leonard Bernstein, Members of the Berlin Radio Chorus, Members Of The New York Philharmonic, Members of the London Symphony Orchestra, Members of the Orchestre de Paris, Members of the Staatskapelle Dresden, Sarah Walker, Symphonieorchester des Bayerischen Rundfunks & Wolfgang Seeliger." Although the lengthy name and artist information could be synthesized to speech, it would not be useful to a listener because it provides too much irrelevant information and fails to provide the most useful identifying information (i.e., the composer). In some instances, composer information for classical music media assets is available as associated text. In this case the composer information could be used instead of, or in addition to, name and artist information, for text to speech synthesis. In other scenarios, composer information may be swapped in the field for artist information, or the composer information may simply not be available. In these cases, associated text may be filtered and substituted with other identifying information for use in text to speech synthesis. More particularly, artist and name information may be filtered and substituted with composer information, as shown in process flow 220 of FIG. 2A.

Process 220 may use an original text string communicated to rendering farm 126 (FIG. 1) and processed using a pre-processor 602 (FIG. 6) of render engine 146 (FIG. 6) to provide a modified text string to synthesizer 604 (FIG. 6) and composer component 606 (FIG. 6). In some embodiments, process 220 may include selection and filtering criteria based on user preferences, and, in other embodiments, standard algorithms may be applied.

Figure 2A:
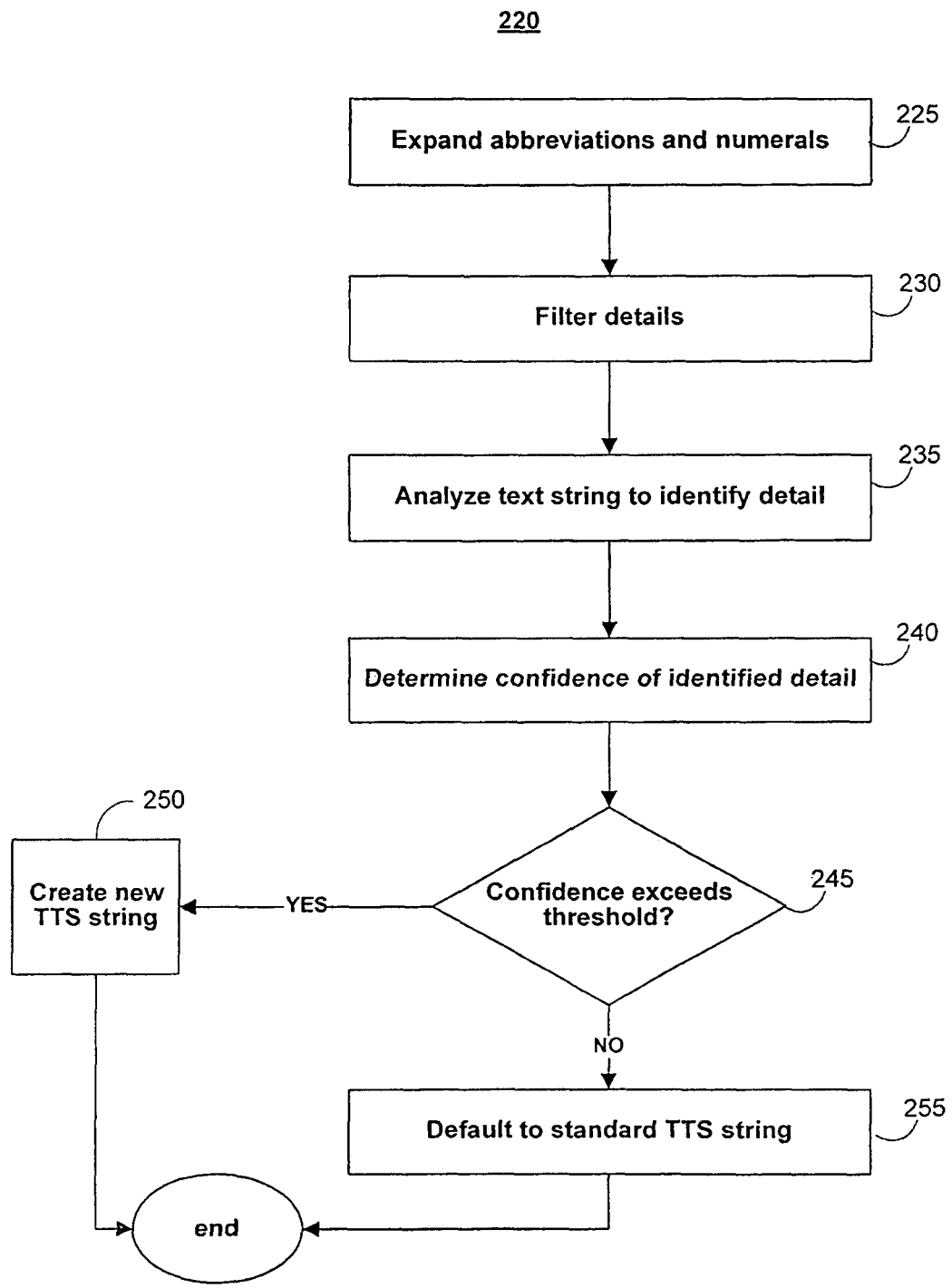
FIG. 2A is a flowchart of an illustrative process for analyzing and modifying a text string in accordance with certain embodiments of the invention.

Turning to FIG. 2A, at step 225, abbreviations in a text string may be normalized and expanded. In particular, name and artist information abbreviations may be expanded. Typical classical music abbreviations include: No., Var., Op., and others. In processing the name in the above example, "Organ Concerto in B-Flat Major Op. 7, No. 1 (HWV 306): IV. Adagio ad libitum (from Harpsichord Sonata in G minor HHA IV, 17 No. 22, Larghetto)," at step 225, the abbreviation for "Op." may be expanded to "Opus," and the abbreviations for "No." may be expanded to "number." Abbreviation expansion may also involve identifying and expanding numerals in the text string. In addition, normalization of numbers or other abbreviations, or other text may be provided in a target language pronunciation. For example, "No." may be expanded to number, nombre, numero, etc. Certain numerals may be indicative of a movement. In this case, the number may be expanded to its relevant ordinal and followed by the word "movement." At step 230, details of the text string may be filtered. Some of the details filtered at step 230 may be considered uninformative or irrelevant details, such as, tempo indications, opus, catalog, or other information may be removed.

An analysis of the text in the expanded and filtered text string remaining after step 230 may be performed to identify certain relevant details at step 235. For example, the text string may be analyzed to determine an associated composer name. This analysis may be performed by comparing the words in the text string to a list of composers in a look up table. Such a table may be stored in a memory (not shown) located remotely or anywhere in front end 104 (e.g., in one or more render engines 146, rendering servers 136, or anywhere else on rendering farm 126). The table may be routinely updated to include new composers or other details. Identification of a composer or other detail may be provided by comparing a part of, or the entire text string with a list of all or many common works. Such a list may be provided in the table. Comparison of the text string with the list may require a match of some portion of the words in the text string.

If only one composer is identified as being potentially relevant to the text string, confidence of its accuracy may be determined to be relatively high at step 240. On the other hand, if more than one composer is identified as being potentially relevant, confidence of each identified composer may be determined at step 240 by considering one or more factors. Some of the confidence factors may be based on correlations between composers and titles, other relevant information such as time of creation, location, source, and relative volume of works, or other factors. A specified confidence threshold may be used to evaluate at step 245 whether an identified composer is likely to be accurate. If the confidence of the identified composer exceeds the threshold, a new text string is created at step 250 using the composer information. Composer information may be used in addition to the original text string, or substituted with other text string information, such as name, artist, title, or other information. If the confidence of the identified composer does not meet the threshold at step 245, the original or standard text string may be used at step 255. The text string obtained using process 220 may be used in steps 206 (FIG. 2) and 208 (FIG. 5) for speech synthesis.

Steps 206 and 208 may be performed using any one of render engines 146 of FIG. 1. More specifically, synthesizer 604 of FIG. 6 may be specifically dedicated to performing steps 206 and/or 208. Synthesizer 604 may be an off-the-shelf synthesizer or may be customized to perform steps 206 and 208. At step 210 of FIG. 2, the desired speech may be derived from the target phonemes. Step 210 may be performed using any one of render engines 146 of FIG. 1. More specifically, composer component 606 of FIG. 6 may be specifically dedicated to performing step 210. Alternatively, synthesized speech may be provided at step 210 based on the normalized text, the native phonemes, the target phonemes, or any combination thereof.

Figure 3:
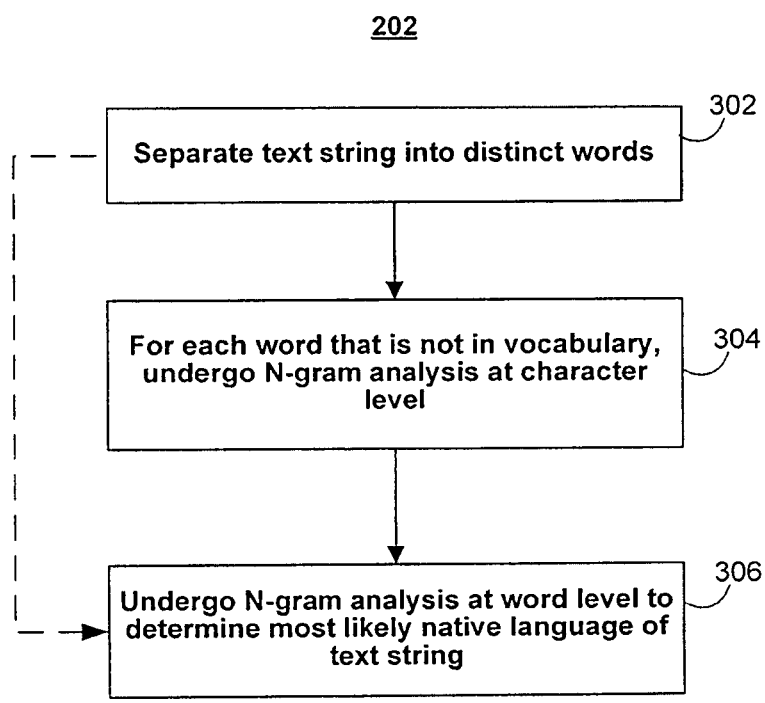
FIG. 3 is a flowchart of an illustrative process for determining the native language of text strings in accordance with certain embodiments of the invention.

Turning to FIG. 3, a flow diagram for determining the native language of a text string in accordance with certain embodiments of the invention is shown. FIG. 3 shows in more detail the steps that may be undertaken to complete step 202 of FIG. 2. Steps 302 through 306 may be performed using any one of render engines 146 of FIG. 1. More specifically, pre-processor 602 of FIG. 6 may perform one or more of these steps.

At step 302 of FIG. 3, the text string may be separated into distinct words. This may be achieved by detecting certain characters that are predefined as boundary points. For example, if a space or a "_" character occurs before or after a specific character sequence, pre-processor 602 may conclude that a particular word that includes the character sequence has begun or ended with the character occurring after or before the space or "_," thereby treating the specific set as a distinct word. Applying step 302 to the text string "La Vie En Rose" that was mentioned above may result in separating the string into the following words "La," "Vie," "En," and "Rose."

In some embodiments, at optional step 304, for each word that is identified in step 302 from the text string, a decision may be made as to whether the word is in vocabulary (i.e., recognized as a known word by the rendering farm). To implement this step, a table that includes a list of words, unigrams, N-grams, character sets or ranges, etc., known in all known languages may be consulted. Such a table may be stored in a memory (not shown) located remotely or anywhere in front end 104 (e.g., in one or more render engines 146, rendering servers 136, or anywhere else on rendering farm 126). The table may be routinely updated to include new words, N-grams, etc.

If all the words are recognized (i.e., found in the table), then process 202 transitions to step 306 without undergoing N-gram analysis at the character level. Otherwise, an N-gram analysis at the character level may occur at step 304 for each word that is not found in the table. Once step 304 is completed, an N-gram analysis at the word level may occur at step 306. In certain embodiments of the invention, step 304 may be omitted, or step 306 may start before step 304. If a word is not recognized at step 306, an N-gram analysis according to step 304 may be undertaken for that word, before the process of step 306 may continue, for example.

As can be seen, steps 304 and 306 may involve what may be referred to as an N-gram analysis, which is a process that may be used to deduce the language of origin for a particular word or character sequence using probability-based calculations. Before discussing these steps further, an explanation of what is meant by the term N-gram in the context of the invention is warranted.

An N-gram is a sequence of words or characters having a length N, where N is an integer (e.g., 1, 2, 3, etc.). If N=1, the N-gram may be referred to as a unigram. If N=2, the N-gram may be referred to as a bigram. If N=3, the N-gram may be referred to as a trigram. N-grams may be considered on a word level or on a character level. On a word level, an N-gram may be a sequence of N words. On a character level, an N-gram may be a sequence of N characters.

Considering the text string "La Vie En Rose" on a word level, each one of the words "La," "Vie," "En," and "Rose" may be referred to as a unigram. Similarly, each one of groupings "La Vie," "Vie En," and "En Rose" may be referred to as a bigram. Finally, each one of groupings "La Vie En" and "Vie En Rose" may be referred to as a trigram. Looking at the same text string on a character level, each one of "V," "i," and "e" within the word "Vie" may be referred to as a unigram. Similarly, each one of groupings "Vi" and "ie" may be referred to as a bigram. Finally, "Vie" may be referred to as a trigram.

At step 304, an N-gram analysis may be conducted on a character level for each word that is not in the aforementioned table. For a particular word that is not in the table, the probability of occurrence of the N-grams that pertain to the word may be determined in each known language. Preferably, a second table that includes probabilities of occurrence of any N-gram in all known languages may be consulted. The table may include letters from alphabets of all known languages and may be separate from, or part of, the first table mentioned above. For each language, the probabilities of occurrence of all possible N-grams making up the word may be summed in order to calculate a score that may be associated with that language. The score calculated for each language may be used as the probability of occurrence of the word in a particular language in step 306. Alternatively, the language that is associated with the highest calculated score may be the one that is determined to be the native language of the word. The latter is especially true if the text string consists of a single word.

For example, if one were to assume that the first table does not include the word "vie," then the probability of occurrence of all possible unigrams, bigrams, and trigrams pertaining to the word and/or any combination of the same may be calculated for English, French, and any or all other known languages. The following demonstrates such a calculation. However, the following uses probabilities that are completely fabricated for the sake of demonstration. For example, assuming that the probabilities of occurrence of trigram "vie" in English and in French are 0.2 and 0.4, respectively, then it may be determined that the probability of occurrence of the word "vie" in English is 0.2 and that the probability of occurrence of the word "vie" in French is 0.4 in order to proceed with step 306 under a first scenario. Alternatively, it may be preliminarily deduced that the native language of the word "vie" is French because the probability in French is higher than in English under a second scenario.

Similarly, assuming that the probabilities of occurrence of bigrams "vi" and "ie" in English are 0.2 and 0.15, respectively, and that the probabilities of occurrence of those same bigrams in French are 0.1 and 0.3, respectively, then it may be determined that the probability of occurrence of the word "vie" in English is the sum, the average, or any other weighted combination, of 0.2 and 0.15, and that the probability of occurrence of the word "vie" in French is the sum, the average, or any other weighted combination, of 0.1 and 0.3 in order to proceed with step 306 under a first scenario. Alternatively, it may be preliminarily deduced that the native language of the word "vie" is French because the sum of the probabilities in French (i.e., 0.4) is higher than the sum of the probabilities in English (i.e., 0.35) under a second scenario.

Similarly, assuming that the probabilities of occurrence of unigrams "v," "i," and "e" in English are 0.05, 0.6, and 0.75, respectively, and that the probabilities of occurrence of those same unigrams in French are 0.1, 0.6, and 0.6, respectively, then it may be determined that the probability of occurrence of the word "vie" in English is the sum, the average, or any other weighted combination, of 0.05, 0.6, and 0.75, and that the probability of occurrence of the word "vie" in French is the sum, the average, or any other weighted combination, of 0.1, 0.6, and 0.6 in order to proceed with step 306 under a first scenario. Alternatively, it may be preliminarily deduced that the native language of the word "vie" is English because the sum of the probabilities in English (i.e., 1.4) is higher than the sum of the probabilities in French (i.e., 1.3) under a second scenario.

Instead of conducting a single N-gram analysis (i.e., either a unigram, a bigram, or a trigram analysis), two or more N-gram analyses may be conducted and the results may be combined in order to deduce the probabilities of occurrence in certain languages (under the first scenario) or the native language (under the second scenario). More specifically, if a unigram analysis, a bigram analysis, and a trigram analysis are all conducted, each of these N-gram sums yield a particular score for a particular language. These scores may be added, averaged, or weighted for each language. Under the first scenario, the final score for each language may be considered to be the probability of occurrence of the word in that language. Under the second scenario, the language corresponding to the highest final score may be deduced as being the native language for the word. The following exemplifies and details this process.

In the above example, the scores yielded using a trigram analysis of the word "vie" are 0.2 and 0.4 for English and French, respectively. Similarly, the scores yielded using a bigram analysis of the same word are 0.35 (i.e., 0.2+0.15) and 0.4 (i.e., 0.1+0.3) for English and French, respectively. Finally, the scores yielded using a unigram analysis of the same word are 1.4 (i.e., 0.05+0.6+0.75) and 1.3 (i.e., 0.1+0.6+0.6) for English and French, respectively. Thus, the final score associated with English may be determined to be 1.95 (i.e., 0.2+0.35+1.4), whereas the final score associated with French may be determined to be 2.1 (i.e., 0.4+0.4+1.3) if the scores are simply added. Alternatively, if a particular N-gram analysis is considered to be more reliable, then the individual scores may be weighted in favor of the score calculated using that N-gram.

Similarly, to come to a final determination regarding native language under any one of the second scenarios, the more common preliminary deduction may be adopted. In the above example, it may deduced that the native language of the word "vie" may be French because two preliminary deductions have favored French while only one preliminary deduction has favored English under the second scenarios. Alternatively, the scores calculated for each language from each N-gram analysis under the second scenarios may be weighted and added such that the language with the highest weighted score may be chosen. As yet another alternative, a single N-gram analysis, such as a bigram or a trigram analysis, may be used and the language with the highest score may be adopted as the language of origin.

At step 306, N-gram analysis may be conducted on a word level. In order to analyze the text string at step 306 on a word level, the first table that is consulted at step 304 may also be consulted at step 306. In addition to including a list of known words, the first table may also include the probability of occurrence of each of these words in each known language. As discussed above in connection with the first scenarios that may be adopted at step 304, in case a word is not found in the first table, the calculated probabilities of occurrence of a word in several languages may be used in connection with the N-gram analysis of step 306.

In order to determine the native language of the text string "La Vie En Rose" at step 306, the probability of occurrence of some or all possible unigrams, bigrams, trigrams, and/or any combination of the same may be calculated for English, French, and any or all other known languages on a word level. The following demonstrates such a calculation in order to determine the native language of the text string "La Vie En Rose." However, the following uses probabilities that are completely fabricated for the sake of demonstration. For example, assuming that the probabilities of occurrence of trigram "La Vie En" in English and in French are 0.01 and 0.7 respectively, then it may be preliminarily deduced that the native language of the text string "La Vie En Rose" is French because the probability in French is higher than in English.

Similarly, assuming that the probabilities of occurrence of bigrams "La Vie," "Vie En," and "En Rose" in English are 0.02, 0.01, and 0.1, respectively, and that the probabilities of occurrence of those same bigrams in French are 0.4, 0.3, and 0.5, respectively, then it may be preliminarily deduced that the native language of the text string "La Vie En Rose" is French because the sum of the probabilities in French (i.e., 1.2) is higher than the sum of the probabilities in English (i.e., 0.13).

Similarly, assuming that the probabilities of occurrence of unigrams "La," "Vie," "En," and "Rose" in English are 0.1, 0.2, 0.05, and 0.6, respectively, and that the probabilities of occurrence of those same unigrams in French are 0.6, 0.3, 0.2, and 0.4, respectively, then it may be preliminarily deduced that the native language of the text string "La Vie En Rose" is French because the sum of the probabilities in French (i.e., 1.5) is higher than the sum of the probabilities in English (i.e., 0.95).

In order to come to a final determination regarding native language at step 306, the more common preliminary deduction may be adopted. In the above example, it may deduced that the native language of the text string "La Vie En Rose" may be French because all three preliminary deductions have favored French. Alternatively, a single N-gram analysis such as a unigram, a bigram, or a trigram analysis may be used and the language with the highest score may be adopted as the native language. As yet another alternative, the scores calculated for each language from each N-gram analysis may be weighted and added such that the language with the highest weighted score may be chosen. In other words, instead of conducting a single N-gram analysis (i.e., either a unigram, a bigram, or a trigram analysis), two or more N-gram analyses may be conducted and the results may be combined in order to deduce the natural language. More specifically, if a unigram analysis, a bigram analysis, and a trigram analysis are all conducted, each of these N-gram sums yield a particular score for a particular language. These scores may be added, averaged, or weighted for each language, and the language corresponding to the highest final score may be deduced as being the natural language for the text string. The following exemplifies and details this process.

In the above example, the scores yielded using a trigram analysis of the text string "La Vie En Rose" are 0.01 and 0.7 for English and French, respectively. Similarly, the scores yielded using a bigram analysis of the same text string are 0.13 (i.e., 0.02+0.01+0.1) and 1.2 (i.e., 0.4+0.3+0.5) for English and French, respectively. Finally, the scores yielded using a unigram analysis of the same text string are 0.95 (i.e., 0.1+0.2+0.05+0.6) and 1.5 (i.e., 0.6+0.3+0.2+0.4) for English and French, respectively. Thus, the final score associated with English may be determined to be 1.09 (i.e., 0.01+0.13+0.95), whereas the final score associated with French may be determined to be 3.4 (i.e., 0.7+1.2+1.5) if the scores are simply added. Therefore, it may be finally deduced that the natural language of the text string "La Vie En Rose" is French because the final score in French is higher than the final score in English.

Alternatively, if a particular N-gram analysis is considered to be more reliable, then the individual scores may be weighted in favor of the score calculated using that N-gram. Optimum weights may be generated and routinely updated. For example, if trigrams are weighed twice as much as unigrams and bigrams, then the final score associated with English may be determined to be 1.1 (i.e., 2*0.01+0.13+0.95), whereas the final score associated with French may be determined to be 4.1 (i.e., 2*0.7+1.2+1.5). Again, it may therefore be finally deduced that the natural language of the text string "La Vie En Rose" is French because the final score in French is higher than the final score in English.

Depending on the nature or category of the text string, the probabilities of occurrence of N-grams used in the calculations of steps 304 and 306 may vary. For example, if the text string pertains to a music file, there may be a particular set of probabilities to be used if the text string represents a song/composition title. This set may be different than another set that is used if the text string represents the artist, performer, or composer. Thus the probability set used during N-gram analysis may depend on the type of metadata associated with media content.

Language may also be determined by analysis of a character set or range of characters in a text string, for example, when there are multiple languages in a text string.

Figure 4:
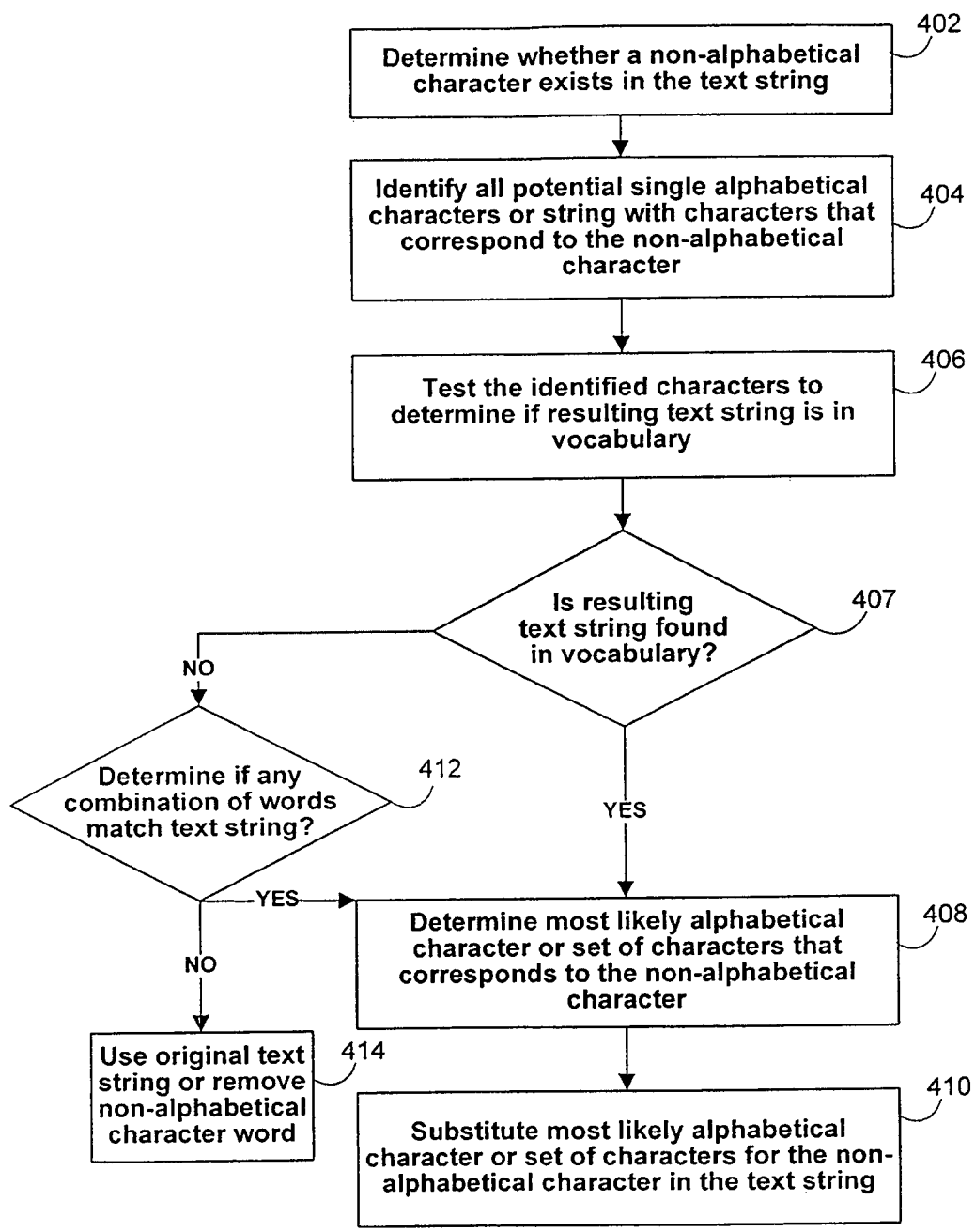
FIG. 4 is a flowchart of an illustrative process for normalizing text strings in accordance with certain embodiments of the invention.

Turning to FIG. 4, a flow diagram for normalizing the text string in accordance with certain embodiments of the invention is shown. Text normalization may be implemented so that the text string may be more easily converted into human sounding speech. For example, text string normalization may be used to expand abbreviations. FIG. 4 shows in more detail the steps that may be undertaken to complete step 204 of FIG. 2. Steps 402 through 410 may be performed using any one of render engines 146 of FIG. 1. More specifically, pre-processor 602 of FIG. 6 may perform these steps.

At step 402 of FIG. 4, the text string may be analyzed in order to determine whether characters other than alphabetical characters exist in the text string. Such characters, which may be referred to as non-alphabetical characters, may be numeric characters or any other characters, such as punctuation marks or symbols that are not recognized as letters in any alphabet of the known languages. Step 402 may also include separating the text string into distinct words as specified in connection with step 302 of FIG. 3.

For each non-alphabetical character identified at step 402, a determination may be made at step 404 as to what potential alphabetical character or string of characters may correspond to the non-alphabetical character. To do this, a lookup table that includes a list of non-alphabetical characters may be consulted. Such a table may include a list of alphabetical characters or string of characters that are known to potentially correspond to each non-alphabetical character. Such a table may be stored in a memory (not shown) located remotely or anywhere in front end 104 (e.g., in one or more render engines 146, rendering servers 136, or anywhere else on rendering farm 126). The table may be routinely updated to include new alphabetical character(s) that potentially correspond to non-alphabetic characters. In addition, a context-sensitive analysis for non-alphabetical characters may be used. For example, a dollar sign "$" in "$0.99" and "$hort" may be associated with the term "dollar(s)" when used with numbers, or with "S" when used in conjunction with letters. A table look up may be used for such context-sensitive analysis, or algorithms, or other methods.

Each alphabetical character or set of characters that are identified as potentially corresponding to the non-alphabetical character identified at step 402 may be tested at step 406. More specifically, the non-alphabetical character identified in a word at step 402 may be substituted for one corresponding alphabetical character or set of characters. A decision may be made as to whether the modified word (or test word) that now includes only alphabetical characters may be found in a vocabulary list at step 407. To implement step 407, a table such as the table discussed in connection with step 302, or any other appropriate table, may be consulted in order to determine whether the modified word is recognized as a known word in any known language. If there is one match of the test word with the vocabulary list, the matched word may be used in place of the original word.

If the test word matches more than one word in the vocabulary list, the table may also include probabilities of occurrence of known words in each known language. The substitute character(s) that yield a modified word having the highest probability of occurrence in any language may be chosen at step 408 as the most likely alphabetical character(s) that correspond to the non-alphabetical character identified at step 402. In other words, the test string having the highest probability of occurrence may be substituted for the original text string. If the unmodified word contains more than one non-alphabetical character, then all possible combinations of alphabetical characters corresponding to the one or more non-alphabetical characters may be tested at step 406 by substituting all non-alphabetical characters in a word, and the most likely substitute characters may be determined at step 408 based on which resulting modified word has the highest probability of occurrence.

In some instances, a test word or the modified text string may not match any words in the vocabulary at step 407. When this occurs, agglomeration and/or concatenation techniques may be used to identify the word. More specifically, at step 412, the test word may be analyzed to determine whether it matches any combination of words, such as a pair of words, in the vocabulary list. If a match is found, a determination of the likelihood of the match may be made at step 408. If more than one match is found, the table may be consulted for data indicating highest probability of occurrence of the words individually or in combination at step 408. At step 410, the most likely alphabetical character or set of characters may be substituted for the non-alphabetical character in the text string at step 410. The phonemes for the matched words may be substituted as described at step 208. Techniques for selectively stressing the phonemes and words may be used, such as those described in connection with process 700 (FIG. 7), as appropriate.

If no match is found at step 412 between the test word and any agglomeration or concatenation of terms in the vocabulary list, at step 414, the original text string may be used, or the non-alphabetical character word may be removed. This may result in the original text string being synthesized into speech pronouncing the symbol or non-alphabetical character, or having a silent segment.

In some embodiments of the invention, the native language of the text string, as determined at step 202 may influence which substitute character(s) are selected at step 408. Similarly, the target language may additionally or alternatively influence which substitute character(s) may be picked at step 408. For example, if a word such as "n." (e.g., which may be known to correspond to an abbreviation of a number) is found in a text string, characters "umber" or "umero" may be identified at step 404 as likely substitute characters in order to yield the word "number" in English or the word "numero" in Italian. The substitute characters that are ultimately selected at step 408 may be based on whether the native or target language is determined to be English or Italian. As another example, if a numerical character such as "3" is found in a text string, characters "three," "drei," "trois," and "tres" may be identified at step 404 as likely substitute characters in English, German, French, and Spanish, respectively. The substitute characters that are ultimately selected at step 408 may be based on whether the native or target language is any one of these languages.

At step 410, the non-alphabetical character identified at step 402 may be replaced with the substitute character(s) chosen at step 408. Steps 402 through 410 may be repeated until there are no more non-alphabetical characters remaining in the text string. Some non-alphabetical characters may be unique to certain languages and, as such, may have a single character or set of alphabetical characters in the table that are known to correspond to the particular non-alphabetical character. In such a situation, steps 406 and 408 may be skipped and the single character or set of characters may be substituted for the non-alphabetical character at step 410.

The following is an example that demonstrates how the text string "P!NK" may be normalized in accordance with process 204 as follows. Non-alphabetical character "!" may be detected at step 402. At step 404, a lookup table operation may yield two potential alphabetical characters "I" and "L" as corresponding to non-alphabetical character "!" —and at steps 406-408, testing each of the potential corresponding characters may reveal that the word "PINK" has a higher likelihood of occurrence than the word "PLNK" in a known language. Thus, the most likely alphabetical character(s) that correspond to non-alphabetical character "!" is chosen as "I," and the text string "P!NK" may be replaced by text string "PINK" for further processing. If a non-alphabetical character is not recognized at step 404 (e.g., there is no entry corresponding to the character in the table), it may be replaced with some character which, when synthesized into speech, is of a short duration, as opposed to replaced with nothing, which may result in a segment of silence.

In another example, the text string "H8PRIUS" may be normalized in accordance with process 204 as follows. Non-alphabetical character "8" may be detected at step 402. At step 404, a lookup table operation may yield two potential alphabetical characters "ATE" and "EIGHT" as corresponding to non-alphabetical character "8" —and at steps 406 and 407, testing each of the potential corresponding characters "HATEPRIUS" and "HEIGHTPRIUS" may reveal that neither word is found in the vocabulary list. At step 412, agglomeration and/or concatenation techniques are applied to the test strings "HATEPRIUS" and "HEIGHTPRIUS" to determine whether the test strings match any combination of words in the vocabulary list. This may be accomplished by splitting the test string into multiple segments to find a match, such as "HA TEPRIUS," "HAT EPRIUS, "HATE PRIUS," "HATEP RIUS," "HAT EPRI US," "HATEP RIUS," "HE IGHT PRIUS," etc. Other techniques may also be used. Matches may be found in the vocabulary list for "HATE PRIUS" and "HEIGHT PRIUS." At step 408, the word pairs "HATE PRIUS" and "HEIGHT PRIUS" may be analyzed to determine the likelihood of correspondence of those words alone or in combination with the original text string by consulting a table. For example, a comparison of the sound of the number "8" may be made with the words "HATE" and "HEIGHT" to identify a likelihood of correspondence. Since "HATE" rhymes with "8," the agglomeration of words "HATE PRIUS" may be determined to be the most likely word pair to correspond to "H8PRIUS." The words (and phonemes for) "HATE PRIUS" may then be substituted at step 410 for "H8PRIUS."

It is worth noting that, for the particular example provided above, it may be more logical to implement normalization step 204 before natural language detection step 202 in process 200. However, in other instances, it may be more logical to undergo step 202 before step 204. In yet other instances, process 200 may step through steps 202 and 204 before again going through step 202. This may help demonstrate why process 200 may be iterative in part, as mentioned above.

Figure 5:
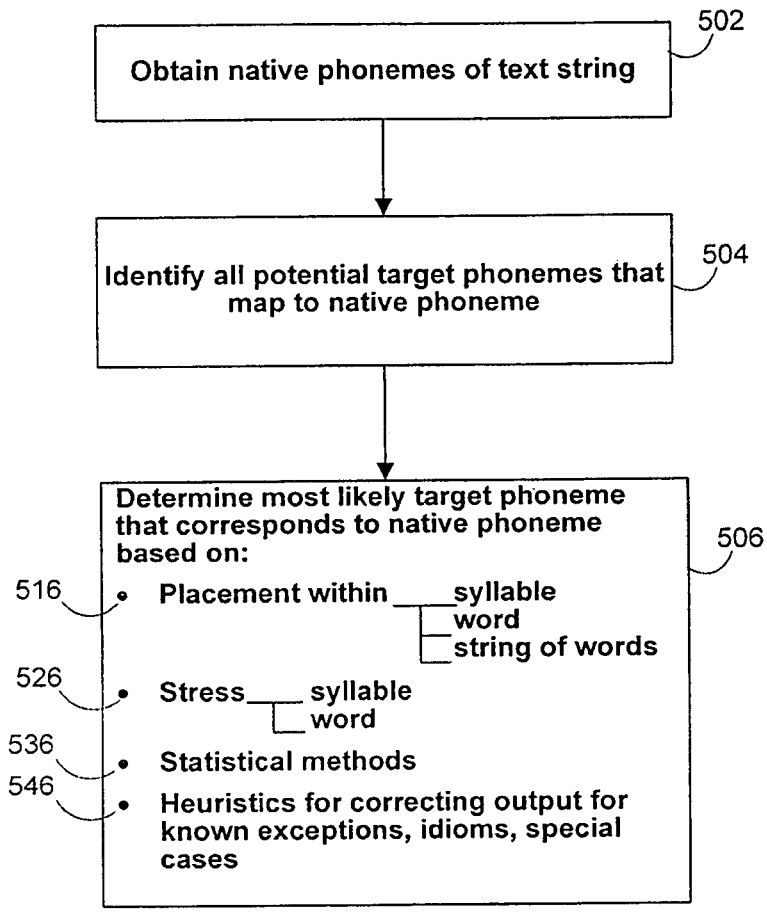
FIG. 5 is a flowchart of an illustrative process for providing phonemes that may be used to synthesize speech from text strings in accordance with certain embodiments of the invention.

Turning to FIG. 5, a flow diagram for performing a process 208, which may be referred to as phoneme mapping, is shown. Obtaining the native phonemes is one of the steps required to implement phoneme mapping. As discussed in connection with FIG. 2, the one or more phonemes that correspond to the text string in the text's native language may be obtained at step 206. More specifically, at step 502 of FIG. 5, which may correspond to step 206 of FIG. 2, a first native phoneme may be obtained for the text string. A pronunciation for that phoneme is subsequently mapped into a pronunciation for a phoneme in the target language through steps 504 and 506 according to certain embodiments of the invention. Alternatively, a pronunciation for phonemes may be associated and obtained via a look up table. Steps 504 and 506 of FIG. 5 show in more detail the different processes that may be undertaken to complete step 208 of FIG. 2, for example. In other words, steps 504 and 506 may correspond to step 208. Steps 502 through 506 may be performed using any one of render engines 146 of FIG. 1. More specifically, synthesizer 604 of FIG. 6 may perform these steps.

At step 502 of FIG. 5, a first native phoneme corresponding to the text string may be obtained in the text's native language. As process 208 is repeated, all native phonemes of the text string may be obtained. As specified above, a phoneme is a minimal sound unit of speech that, when contrasted with another phoneme, affects the naming of words in a particular language. For example, if the native language of text string "schul" is determined to be German, then the phonemes obtained at step 206 may be "Sh," "UH," and "LX." Thus, the phonemes obtained at each instance of step 502 may be first phoneme "Sh," second phoneme "UH," and third phoneme "LX."

In addition to the actual phonemes that may be obtained for the text string, markup information related to the text string may also be obtained at step 502. Such markup information may include syllable boundaries, stress (i.e., pitch accent), prosodic annotation or part of speech, and the like. Such information may be used to guide the mapping of phonemes between languages as discussed further below.

For the native phoneme obtained at step 502, a determination may be made at step 504 as to what potential phoneme(s) in the target language may correspond to it. To do this, a lookup table mapping phonemes in the native language to phonemes in the target language according to certain rules may be consulted. One table may exist for any given pair of languages or dialects. For the purposes of the invention, a different dialect of the same language may be treated as a separate language. For example, while there may be a table mapping English phonemes (e.g., phonemes in American English) to Italian phonemes and vice versa, other tables may exist mapping British English phonemes to American English phonemes and vice versa. All such tables may be stored in a database on a memory (not shown) located remotely or anywhere in front end 104 (e.g., in one or more render engines 146, rendering servers 136, or anywhere else on rendering farm 126). These table may be routinely updated to include new phonemes in all languages.

An exemplary table for a given pair of languages may include a list of all phonemes known in a first language under a first column, as well as a list of all phonemes known in a second language under a second column. Each phoneme from the first column may map to one or more phonemes from the second column according to certain rules. Choosing the first language as the native language and the second language as the target language may call up a table from which any phoneme from the first column in the native language may be mapped to one or more phonemes from the second column in the target language.

For example, if it is desired to synthesize the text string "schul" (whose native language was determined to be German) such that the resulting speech is vocalized in English (i.e., the target language is set to English), then a table mapping German phonemes to English phonemes may be called up at step 504. The German phoneme "UH" obtained for this text string, for example, may map to a single English phoneme "UW" at step 504.

If only one target phoneme is identified at step 504, then that sole target phoneme may be selected as the target phoneme corresponding to the native phoneme obtained at step 502. Otherwise, if there is more than one target phoneme to which the native phoneme may map, then the most likely target phoneme may be identified at step 506 and selected as the target phoneme that corresponds to the native phoneme obtained at step 502.

In certain embodiments, the most likely target phoneme may be selected based on the rules discussed above that govern how phonemes in one language may map to phonemes in other language within a table. Such rules may be based on the placement of the native phoneme within a syllable, word, or neighboring words within the text string as shown in 516, the word or syllable stress related to the phoneme as shown in 526, any other markup information obtained at step 502, or any combination of the same. Alternatively, statistical analysis may be used to map to the target phoneme as shown in 536, heuristics may be used to correct an output for exceptions, such as idioms or special cases, or using any other appropriate method. If a target phoneme is not found at step 504, then the closest phoneme may be picked from the table. Alternatively, phoneme mapping at step 506 may be implemented as described in commonly-owned U.S. Pat. Nos. 6,122,616, 5,878,396, and 5,860,064, issued on Sep. 19, 2000, Mar. 2, 1999, and Jan. 12, 1999, respectively, each of which are hereby incorporated by reference herein in their entireties.

Repeating steps 502 through 506 for the entire text string (e.g., for each word in the text string) may yield target phonemes that can dictate how the text string is to be vocalized in the target language. This output may be fed to composer component 606 of FIG. 6, which in turn may provide the actual speech as if it were spoken by a person whose native language is the target language. Additional processing to make the speech sound more authentic or have it be perceived as more pleasant by users, or, alternatively, to blend it better with the media content, may be implemented. Such processing may include dynamics compression, reverberation, de-essing, level matching, equalizing, and/or adding any other suitable effects. Such speech may be stored in a format and provided to users through the system described in conjunction with FIG. 1. The synthesized speech may be provided in accordance with the techniques described in commonly-owned, co-pending patent application Ser. No. 10/981,993, filed on Nov. 4, 2004 (now U.S. Published Patent Application No. 2006/0095848), and in commonly-owned, co-pending patent application Ser. No. 11/369,480, filed on Mar. 6, 2006 (now U.S. Published Patent Application No. 2006-0168150), each of which is mentioned above.

Figure 7:
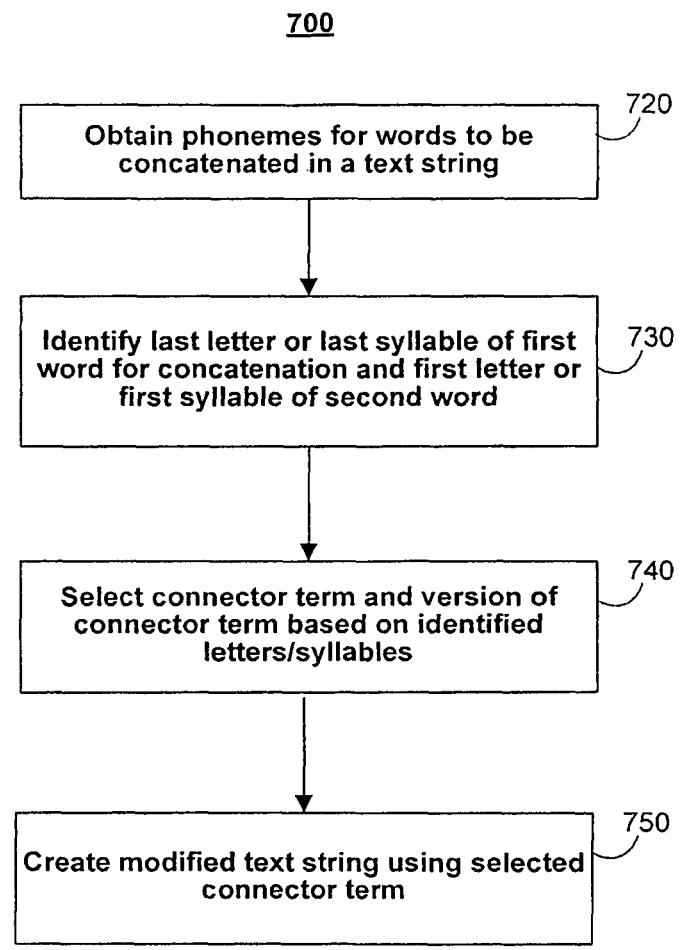
FIG. 7 is a flowchart of an illustrative process for providing concatenation of words in a text string in accordance with certain embodiments of the invention.
Figure 8:
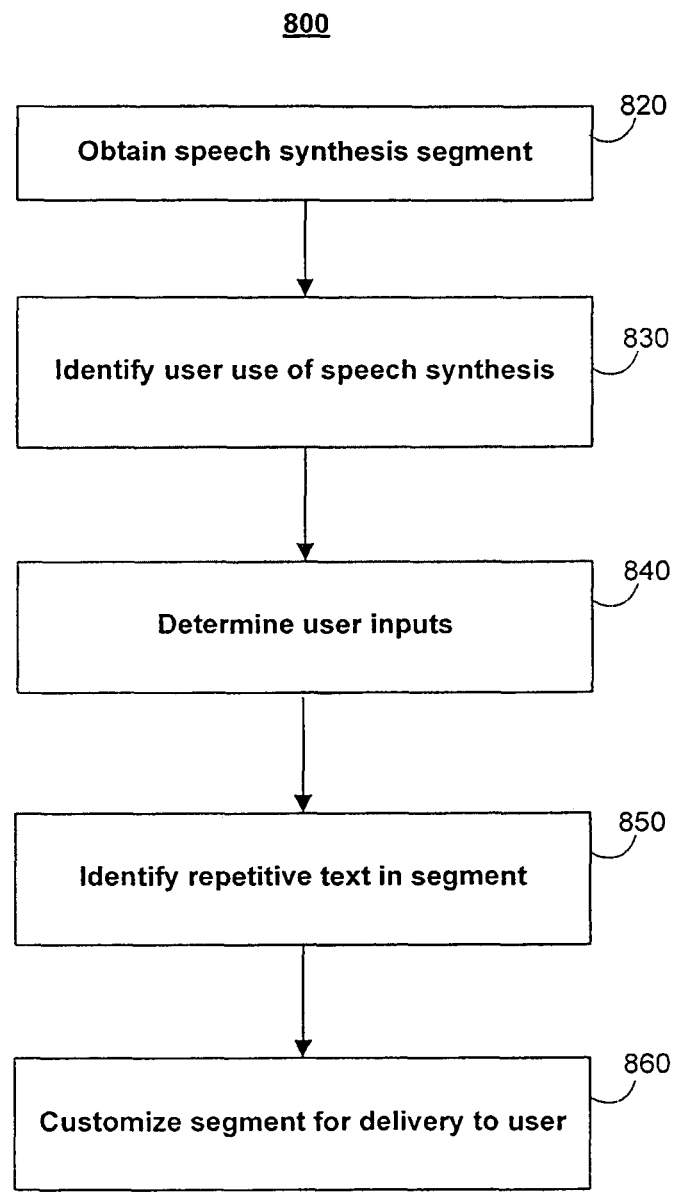
FIG. 8 is a flowchart of an illustrative process for modifying delivery of speech synthesis in accordance with certain embodiments of the invention.

Additional processing for speech synthesis may also be provided by render engine 146 (FIG. 6) according to the process 700 shown in FIG. 7. Process 700 may be designed to enhance synthesized speech flow so that a concatenation of words, or phrases may be synthesized with a connector to have a natural flow. For example, associated content for a media asset song "1979" by the "Smashing Pumpkins" may be synthesized to speech to include the song title "1979" and "Smashing Pumpkins." The connectors words "by the" may be inserted between the song and artist. In another example, associated content for "Borderline" by "Madonna" may be synthesized using the connector term "by." In addition, the connector word "by" may be synthesized in a selected manner that enhances speech flow between the concatenated words and phrases.

Process 700 may be performed using processing of associated text via pre-processor 602 (FIG. 6). Processed text may be synthesized to speech using synthesizer 604 (FIG. 6) and composer component 606 (FIG. 6). Optionally, functions provided by synthesizer 604 (FIG. 6) and composer component 606 (FIG. 6) are provided by one integrated component. In some embodiments, process 700 may be performed prior to step 210 (FIG. 2) so that a complete text string is synthesized. In other embodiments, process 700 may be provided after step 210 to connect elements of synthesized speech.

Turning to FIG. 7, a phoneme for a text string of at least two words to be concatenated may be obtained at step 720. For example, phonemes for associated text of a media asset name and artist may be obtained for concatenation in delivery as synthesized speech. To select a connector term for insertion between the name and artist word(s), a last letter (or last syllable) of the phoneme for the song name may be identified at step 730. Also at step 730, a first letter (or first syllable) of the phoneme for the artist may be identified. Using the example above, for the song name "1979," the last letter "E" (or syllable) for the phoneme for the last word "nine" is identified, together with the first letter "S" (or first syllable) for the artist "Smashing Pumpkins."

One or more connector terms may be selected at step 740 based on the identified letters (or syllables) by consulting a table and comparing the letters to a list of letters and associated phonemes in the table. Such a table may be stored in a memory (not shown) located remotely or anywhere in front end 104 (e.g., in one or more render engines 146, rendering servers 136, or anywhere else on rendering farm 126). The table may be routinely updated to include new information or other details. In addition, a version of the selected connector term may be identified by consulting the table. For example, "by" may be pronounced in several ways, one of which may sound more natural when inserted between the concatenated terms.

The connector term and relevant version of the connector term may be inserted in a modified text string at step 750 between the concatenated words. The modified text string may be delivered to the composer component 606 (FIG. 6) for speech synthesis.

The systems and methods described herein may be used to provide text to speech synthesis for delivering information about media assets to a user. In use, the speech synthesis may be provided in addition to, or instead of, visual content information that may be provided using a graphical user interface in a portable electronic device. Delivery of the synthesized speech may be customized according to a user's preference, and may also be provided according to certain rules. For example, a user may select user preferences that may be related to certain fields of information to be delivered (e.g., artist information only), rate of delivery, language, voice type, skipping repeating words, and other preferences. Such selection may be made by the user via the PED 108 (FIG. 1) directly, or via a host device 102 (FIG. 1). Such types of selections may also be automatically matched and configured to a particular user according to the process 800 shown in FIG. 8.

Process 800 may be implemented on a PED 108 using programming and processors on the PED. As shown, a speech synthesis segment may be obtained at step 820 by PED 108. The speech synthesis segment may be obtained via delivery from the front end 104 (FIG. 1) to the PED 108 (FIG. 1) via network 106 (FIG. 1) and in some instances, from host device 102 (FIG. 1). In general, speech synthesis segments may be associated with a media asset that may be concurrently delivered to the PED 108 (FIG. 1).

The PED may include programming capable of determining whether its user is listening to speech synthesis at step 830. For example, the PED may determine that selections are made by a user to listen to speech synthesis. In particular, a user may actively select speech synthesis delivery, or not actively omit speech synthesis delivery. User inputs may also be determined at step 840. User inputs may include, for example, skipping speech synthesis, fast forwarding through speech synthesis, or any other input. These inputs may be used to determine an appropriate segment delivery type. For example, if a user is fast forwarding through speech synthesized information, the rate of the delivery of speech synthesis may be increased. Increasing a rate of delivery may be performed using faster speech rates, shortening breaks or spaces between words, truncating phrases, or other techniques. In other embodiments, if the user fast forwards through speech synthesized information, it may be omitted for subsequent media items, or the next time the particular media item is presented to the user.

At step 850 repetitive text may be identified in the segment. For example, if a word has been used recently (such as in a prior or preceding artist in a collection of songs by the artist), the repeated word may be identified. In some embodiments, repeated words may be omitted from a segment delivered to a user. In other embodiments, a repeated word may be presented in a segment at a higher rate of speech, for example, using faster speech patterns and/or shorter breaks between words. In another embodiment, repeated phrases may be truncated.

Based on the user's use of speech synthesis identified at step 830, user's inputs determined at step 840, and repetitive text identified at step 850, a customized segment may be delivered to a user at step 860. User-customized segments may include a delivered segment that omits repeated words, changes a rate of delivery or playback of the segment, truncating phrases, or other changes. Combinations of changes may be made based on the user's use and inputs and segment terms, as appropriate.

As can be seen from the above, a number of systems and methods may be used alone or in combination for synthesizing speech from text using sophisticated text-to-speech algorithms. In the context of media content, such text may be any metadata associated with the media content that may be requested by users. The synthesized speech may therefore act as audible means that may help identify the media content to users. In addition, such speech may be rendered in high quality such that it sounds as if it were spoken in normal human language in an accent or dialect that is familiar to a user, no matter the native language of the text or the user. Not only are these algorithms efficient, they may be implemented on a server farm so as to be able to synthesize speech at high rates and provide them to users of existing portable electronic devices without having to modify these devices. Thus, the rate at which synthesized speech may be provided can be about one-twentieth of real time (i.e., a fraction of the length of the time a normal speaker would take to read the text that is desired to be converted).

Various configurations described herein may be combined without departing from the invention. The above-described embodiments of the invention are presented for purposes of illustration and not of limitation. The invention also can take many forms other than those explicitly described herein, and can be improved to render more accurate speech. For example, users may be given the opportunity to provide feedback to enable the server farm or front end operator to provide more accurate rendering of speech. For example, users may be able to provide feedback regarding what they believe to be the language of origin of particular text, the correct expansion of certain abbreviations in the text, and the desired pronunciation of certain words or characters in the text. Such feedback may be used to populate the various tables discussed above, override the different rules or steps described, and the like.

Accordingly, it is emphasized that the invention is not limited to the explicitly disclosed systems and methods, but is intended to include variations to and modifications thereof which are within the spirit of the following claims.

What is claimed is:

1. A method for determining a native language of a text string associated with metadata of a media asset, the method comprising:
   at an electronic device comprising a processor and memory storing instructions for execution by the processor:
      undergoing one or more N-gram analyses at a word level to determine a plurality of probabilities of occurrence of the text string, where each of the probabilities of occurrence correspond to a probability of occurrence of the text string in a particular language of a plurality of languages, wherein, for each language, the one or more N-gram analyses are based on a first set of probabilities of occurrence of words if the text string corresponds to a first type of metadata field associated with the media asset, and are based on a second set of probabilities of occurrence of words if the text string corresponds to a second type of metadata field associated with the media asset; and
      determining that the native language of the text string is a language that is associated with the highest probability of occurrence out of the plurality of probabilities of occurrence.

2. The method of claim 1 wherein the one or more N-gram analyses at a word level comprises:
   for each group of a number N of words in the text string, retrieving a plurality of probabilities, each of which corresponds to a particular language and represents the probability of occurrence of that group of N words in that particular language; and
   for each language, calculating a total sum of the retrieved probabilities.

3. The method of claim 2 wherein determining the native language of the text string comprises determining that the native language is a language having the highest calculated total sum.

4. The method of claim 1 wherein the one or more N-gram analyses at a word level comprises a unigram analysis wherein, for each word in the text string, a plurality of probabilities are retrieved, each of which corresponds to a particular language and represents the probability of occurrence of that word in that particular language.

5. The method of claim 1 wherein the one or more N-gram analyses at a word level comprises a bigram analysis wherein, for each group of two adjacent words in the text string, a plurality of probabilities are retrieved, each of which corresponds to a particular language and represents the probability of occurrence of that group of words in that particular language.

6. The method of claim 1 wherein the one or more N-gram analyses at a word level comprises a trigram analysis wherein, for each group of three adjacent words in the text string, a plurality of probabilities are retrieved, each of which corresponds to a particular language and represents the probability of occurrence of that group of words in that particular language.

7. The method of claim 1 wherein the one or more N-gram analyses at a word level comprises any combination of a unigram analysis, a bigram analysis and a trigram analysis, wherein total probability sums are calculated under each such analysis and are weighted differently.

8. The method of claim 1 further comprising separating the text string into distinct words.

9. The method of claim 1 further comprising determining whether each word in the text string is in vocabulary by consulting a table that includes a list of words that are known in all known languages.

10. The method of claim 9 further comprising, for each word that is not in vocabulary, undergoing one or more N-gram analyses at a character level to determine a plurality of probabilities of occurrence of the word, where each of the probabilities of occurrence of the word correspond to a probability of occurrence of the word in a particular language of the plurality of languages.

11. The method of claim 10 wherein the one or more N-gram analyses at a character level comprises:
   for each group of a number N of characters in the word that is not in vocabulary, retrieving a plurality of probabilities, each of which corresponds to a particular language and represents the probability of occurrence of that group of N characters in that particular language; and
   for each language, calculating a total sum of the retrieved probabilities.

12. The method of claim 10 wherein the one or more N-gram analyses at a character level comprises a unigram analysis wherein, for each character in the word that is not in vocabulary, a plurality of probabilities are retrieved, each of which corresponds to a particular language and represents the probability of occurrence of that character in that particular language.

13. The method of claim 10 wherein the one or more N-gram analyses at a character level comprises a bigram analysis wherein, for each group of two adjacent characters in the word that is not in vocabulary, a plurality of probabilities are retrieved, each of which corresponds to a particular language and represents the probability of occurrence of that group of characters in that particular language.

14. The method of claim 10 wherein the one or more N-gram analyses at a character level comprises a trigram analysis wherein, for each group of three adjacent characters in the word that is not in vocabulary, a plurality of probabilities are retrieved, each of which corresponds to a particular language and represents the probability of occurrence of that group of characters in that particular language.

15. The method of claim 10 wherein the one or more N-gram analyses at a character level comprises any combination of a unigram analysis, a bigram analysis and a trigram analysis, wherein total probability sums are calculated under each such analysis and are weighted differently.

16. The method of claim 10, wherein for each language, the one or more N-gram analyses at a character level are based on a first set of probabilities of occurrence of characters if the text string corresponds to the first metadata field associated with the media asset, and are based on a second set of probabilities of occurrence of characters if the text string corresponds to the second metadata field associated with the media asset.

17. The method of claim 1, wherein the first metadata field associated with the media asset is a title of a media asset.

18. The method of claim 17, wherein the second metadata field associated with the media asset is any of an artist, a performer, or a composer of a media asset.

19. The method of claim 1, wherein the media asset is an audio file.

20. The method of claim 1, wherein the first metadata field corresponds to a first category of metadata, and the second metadata field corresponds to a second category of metadata.

* * * * *